(12) United States Patent
Karito

(10) Patent No.: US 7,660,017 B2
(45) Date of Patent: Feb. 9, 2010

(54) IMAGE PROCESSOR, IMAGE PROCESSING METHOD AND IMAGE PROCESSING PROGRAM

(75) Inventor: Nobuhiro Karito, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 598 days.

(21) Appl. No.: 11/432,448

(22) Filed: May 10, 2006

(65) Prior Publication Data

US 2006/0256355 A1 Nov. 16, 2006

(30) Foreign Application Priority Data

May 16, 2005 (JP) .............................. 2005-142295
Apr. 5, 2006 (JP) .............................. 2006-104319

(51) Int. Cl.
*G06K 15/00* (2006.01)
(52) U.S. Cl. ..................... 358/3.14; 358/3.13; 358/3.06
(58) Field of Classification Search ................ 358/3.06, 358/3.13, 3.14; 382/288
See application file for complete search history.

(56) References Cited

U.S. PATENT DOCUMENTS

2004/0174569 A1* 9/2004 Karito ....................... 358/3.01

FOREIGN PATENT DOCUMENTS

| JP | 04-195137 | 7/1992 |
|----|-----------|--------|
| WO | 2005/109851 | 11/2005 |

* cited by examiner

*Primary Examiner*—Benny Q Tieu
*Assistant Examiner*—Oleg Roytburd
(74) *Attorney, Agent, or Firm*—Hogan & Hartson LLP

(57) ABSTRACT

An image processor for converts input grayscale values into output grayscale values having two or more grayscales by dividing an input image into pixel groups each including pixels and applying a dither matrix to each pixel group a center of gravity position of the pixel group from the input grayscale value of each pixel included in the pixel group; the center of the dither matrix on the center of gravity position of the pixel group; and output the output grayscale values by corresponding the positioned dither matrix and the input grayscale value of each pixel included in the pixel group. By this, the center of the dither matrix is positioned on the center of gravity position of the pixel group. So dots are generated at the most appropriate positions to reproduce an input image faithfully.

10 Claims, 28 Drawing Sheets

EXAMPLE OF REPEATED MATRIX M

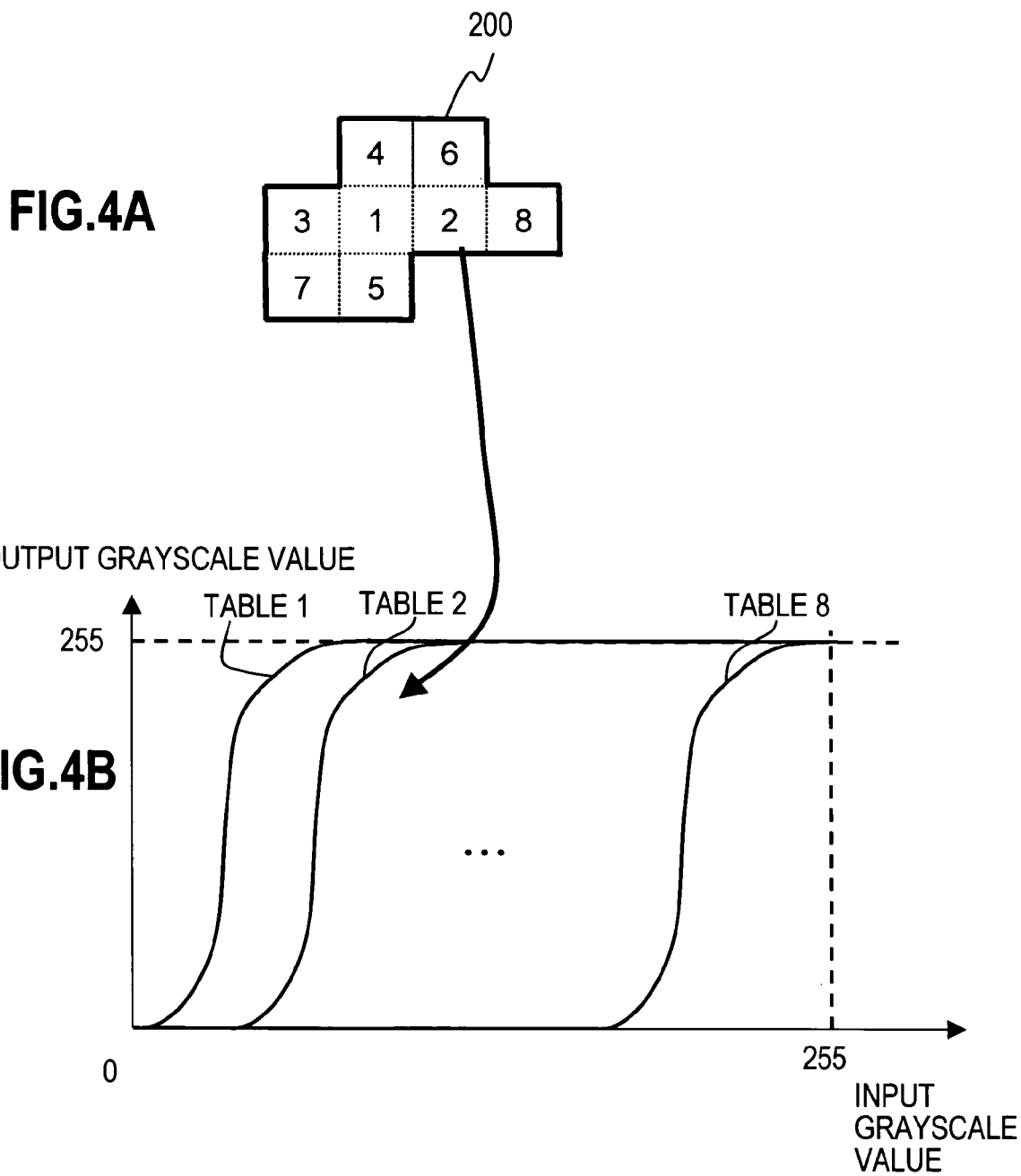

200
| 7 | 5 | 8 |
|---|---|---|
| 3 | 1 | 2 |
| 9 | 4 | 6 |
FIG.5A
100
| 255 | 255 | 255 |
|---|---|---|
| 0 | 0 | 0 |
| 0 | 0 | 0 |
FIG.5B
100
FIG.5C
| 7 | 5 | 8 |
|---|---|---|
| 3 | 1 | 2 |
| 9 | 4 | 6 |
200
FIG.5D
200
| 3 | 1 | 2 |
|---|---|---|
| 9 | 4 | 6 |
| 7 | 5 | 8 |
SHIFT     SHIFT
100

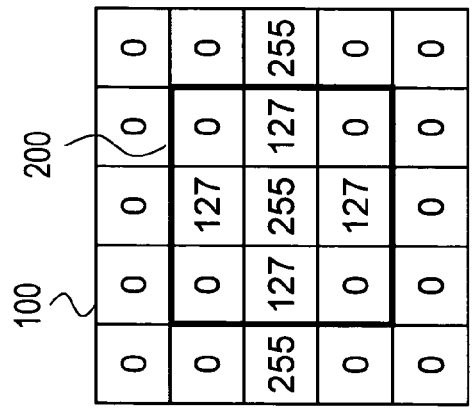
FIG. 6B OUTPUT EXAMPLE
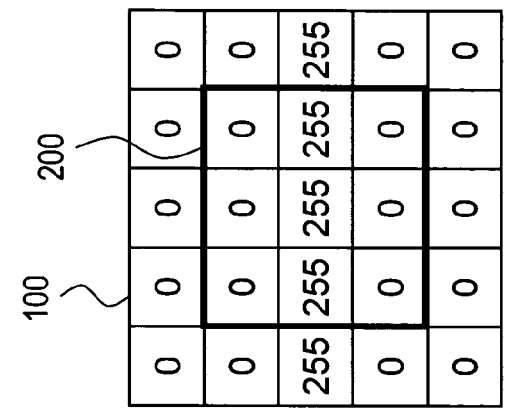
FIG. 6D OUTPUT EXAMPLE
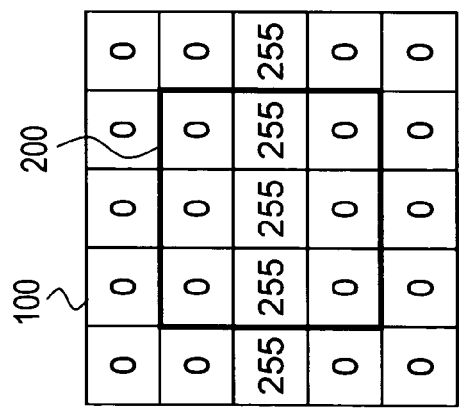
FIG. 6A INPUT EXAMPLE
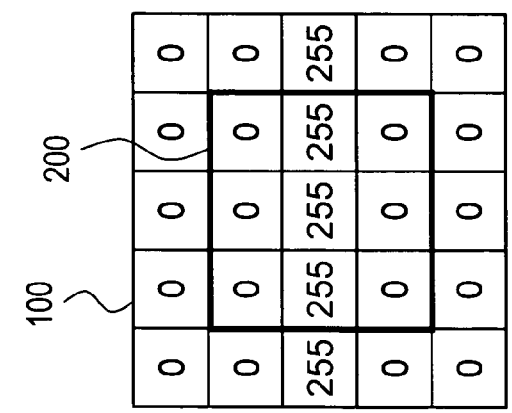
FIG. 6C INPUT EXAMPLE

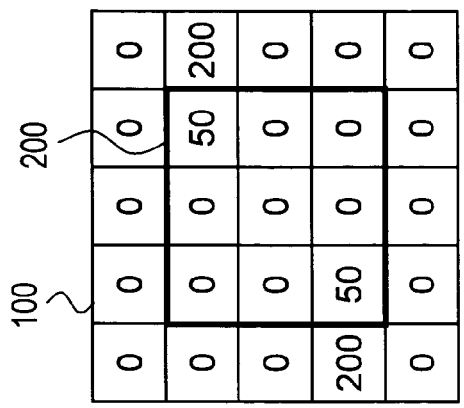
FIG.7B OUTPUT EXAMPLE
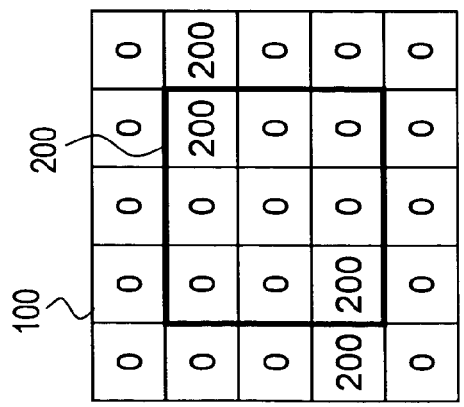
FIG.7A INPUT EXAMPLE
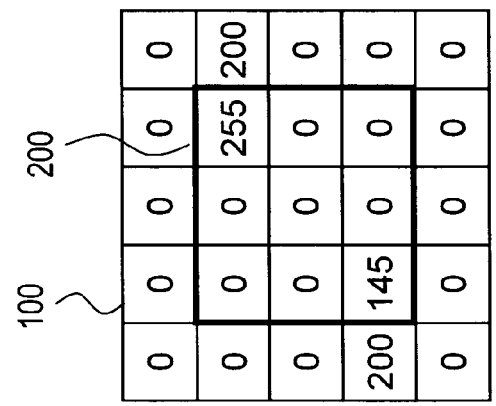
FIG.7C OUTPUT EXAMPLE

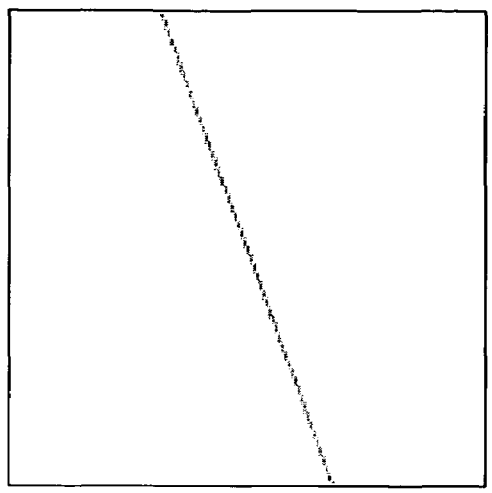
FIG.15A  EXAMPLE OF INPUT IMAGE
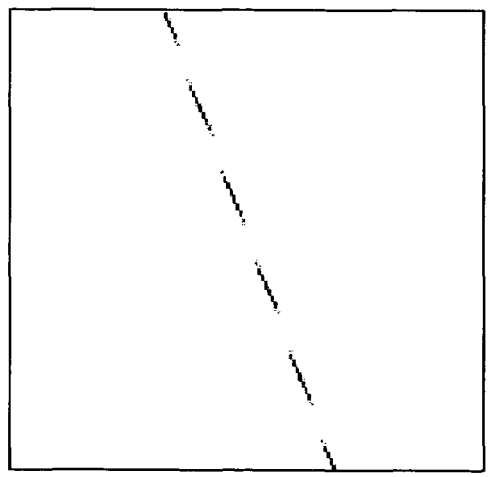 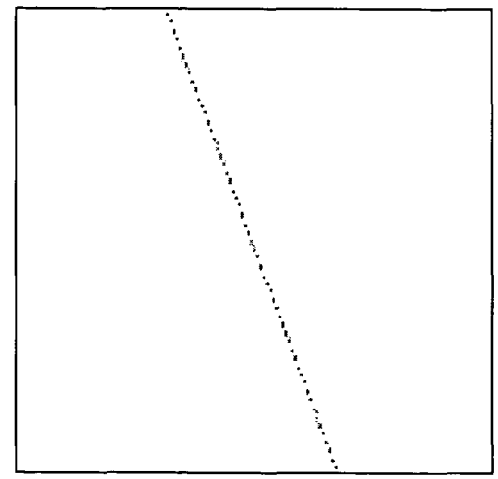
FIG.15B  EXAMPLE OF OUTPUT IMAGE BY MULTI-VALUE DITHER METHOD
FIG.15C  EXAMPLE OF OUTPUT IMAGE BY PRESENT INVENTION

EXAMPLE OF REPEATED MATRIX M

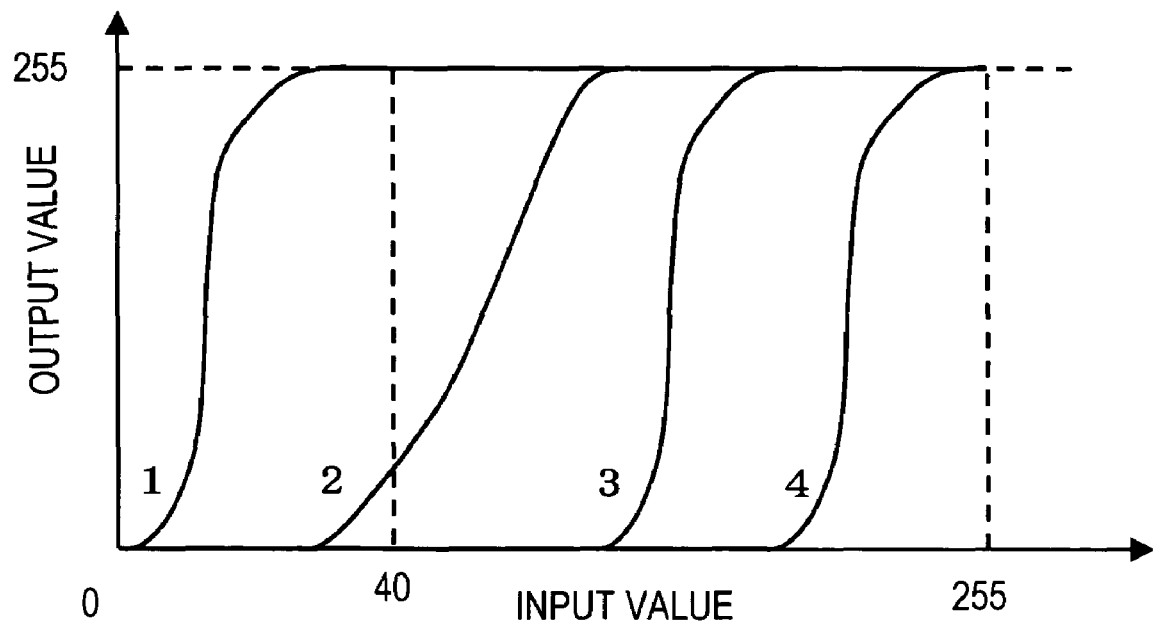
FIG.21A    EXAMPLE OF INDEX MATRIX
FIG.21B    EXAMPLE OF GAMMA TABLE

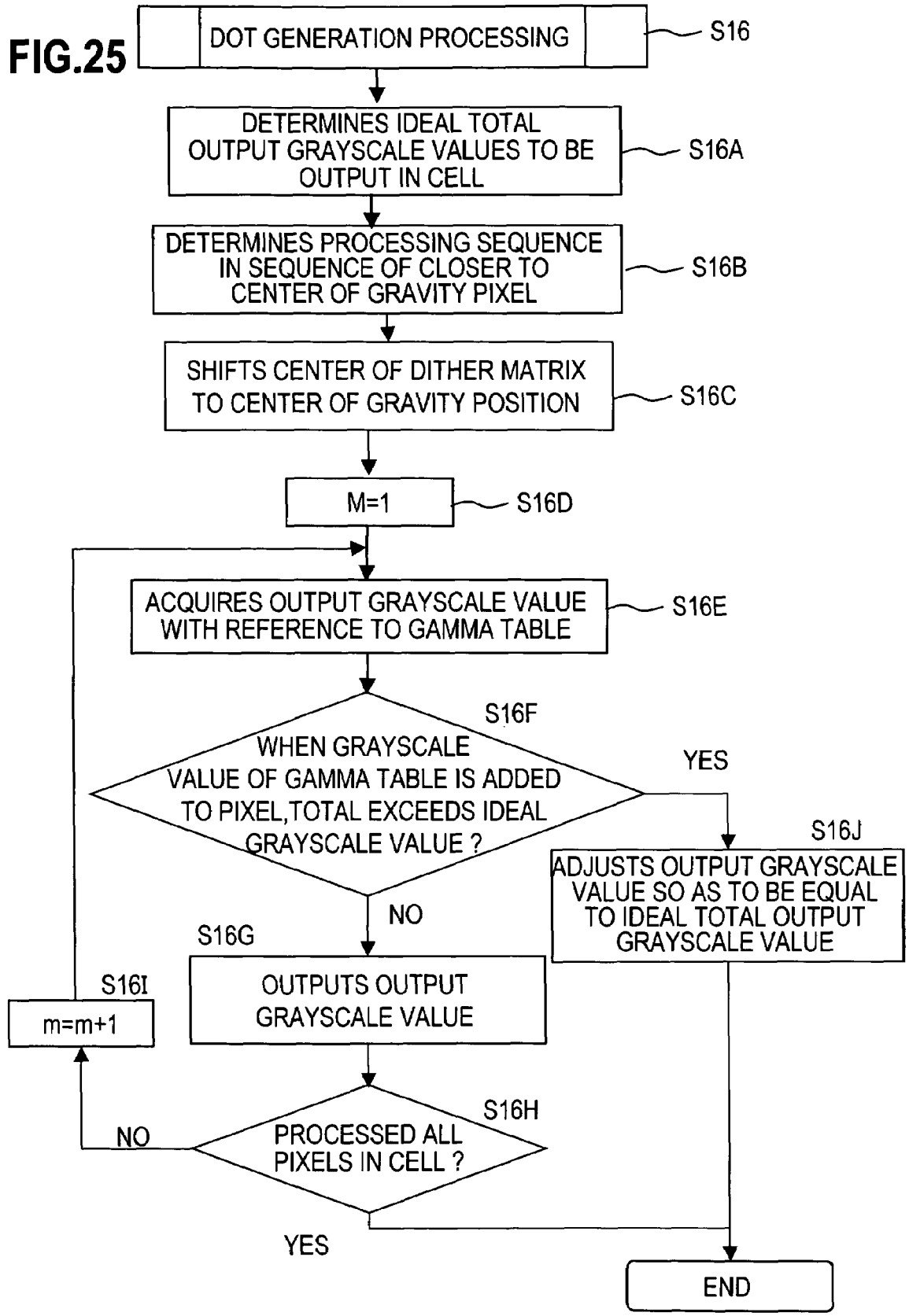

CENTER OF GRAVITY
X  2.3
Y  2
TOTAL INPUT GRAYSCALE VALUES 320
IDEAL TOTAL OUTPUT VALUE 320

CENTER OF GRAVITY
X  1
Y  2.4
TOTAL INPUT GRAYSCALE VALUES 100
IDEAL TOTAL OUTPUT VALUE 100

SHIFT AMOUNT (-1, 0)

IMAGE PROCESSOR, IMAGE PROCESSING METHOD AND IMAGE PROCESSING PROGRAM

CROSS-REFERENCE TO RELATED APPLICATIONS

This application is based upon and claims the benefit of priority from the prior Japanese Patent Applications No. 2005-142295, filed on May 16, 2005, and No.2006-104319, filed on Apr. 5, 2006, the entire contents of which are incorporated herein by reference.

BACKGROUND OF THE INVENTION

1. Field of the Invention

The present invention relates to an image processor, image processing method and image processing program, and more particularly to an image processor for eliminating the blurring of output images and acquiring output images faithful to input.

2. Description of the Related Art

Image processors, such as a printer, have been converting input image data, which have multi-value grayscale values for each pixel, into output image data having lower grayscale values (e.g. binary) by half tone processing, and printing the output image data onto print paper.

As a half tone processing, processing by a dot concentrated dither method (multi-value dither method) is known. In the multi-value dither method, thresholds are distributed so that dots grow from the center in a predetermined size of matrix, and processing is performed by comparing the thresholds with an input grayscale value of each pixel.

However if a threshold matrix is applied to the input image, in some cases the input grayscale value of the pixel is lost in an area where the threshold is high, and the input value is converted into an unnecessarily large output value in an area where the threshold is low. For example, if a fine line exists in the threshold matrix, the fine line in the output image may be disconnected. Therefore processing by the multi-value dither method has a problem in the image quality of the output image.

Therefore there is a prior art where a plurality of threshold matrices having different dot growth characteristics are provided, a matrix with which a desired dot size can be acquired is judged for each halftone generation area, and the threshold matrix to be used is switched (e.g. Japanese Patent Application Laid-Open No. H4-195137).

With this method however, a memory for recording a plurality of threshold matrices is required. Also the calculation volume is high since dither processing is performed for a plurality of times for all the pixels of the input image when the matrix is switched. Also in the case of processing by the multi-value dither method, including this method, the dot positions are fixed with a predetermined spacing, so a dot cannot be generated at an optimum position to reproduce the grayscale value distribution which was input, and low resolution images, which are not faithful to the input, may be output.

To solve these problems, the present applicant proposed a method of determining a center of gravity position from a grayscale value of each pixel in a cell which consists of a plurality of pixels, and generating a dot corresponding to the sum of the grayscale values of each pixel at the center of gravity position (e.g. Japanese Patent Application No. 2004-137326 (not published), hereafter called "AAM (Advanced AM Screen) Method").

With the AAM method, however, dots are grown from the center of gravity position in a cell, so even if a fine line exists in the cell, for example, it is reproduced as a circular dot, and the output image becomes a blur.

With the foregoing in view, it is an object of the present invention to provide an image processor, image processing method and image processing program which can acquire an output image faithful to the input image, without blurring of the output image.

SUMMARY OF THE INVENTION

To achieve the above objects, the present invention provides an image processor for converting input grayscale values into output grayscale values having two or more grayscales by dividing an input image into pixel groups each including a plurality of pixels and applying a dither matrix to each of the pixel groups, having: a center of gravity position decision unit for deciding a center of gravity position of the pixel group from the input grayscale value of each pixel included in the pixel group; a positioning unit for positioning the center of the dither matrix on the center of gravity position of the pixel group; and an output unit for acquiring the output grayscale values by corresponding the positioned dither matrix and the input grayscale value of each pixel included in the pixel group. By this, the center of the dither matrix is positioned on the center of gravity position of the pixel group. So dots are generated at the most appropriate positions to reproduce an input image faithfully.

According to a preferred embodiment of the present invention, in the image processor, when the total of output grayscale value reaches to an ideal grayscale value based on the total of the input grayscale values in the pixel group, the output unit ends processing to acquire the output grayscale values in the pixel group. By this, the output processing ends when an output image with an ideal dot size to be output is acquired, so an excessive spread of dots is suppressed, and density is maintained between input/output images.

According to a preferred embodiment of the present invention, in the image processor, the output unit acquires the output grayscale values sequentially from a pixel closest to the center of gravity position. By this, a dot is always generated in the pixel closest to the center of gravity position, and an output image faithful to the input image can be acquired.

According to a preferred embodiment of the present invention, in the image processor, a table number of a table, that indicates the correspondence of the input grayscale value and the output grayscale value, is stored in the dither matrix, and the output unit acquires an output grayscale value corresponding to the input grayscale value by referring to the table number of the dither matrix corresponding to each pixel position included in the pixel group. By this, the output grayscale value to indicate the generation of a dot is not output to the pixel of which the input grayscale value is "0", so an output image with circular dots is not generated, and the blurring of the output image can be prevented.

According to a preferred embodiment of the present invention, in the image processor, thresholds are stored in the dither matrix, and the output unit acquires the output grayscale values by comparing the thresholds and the input grayscale values. By this, the blurring of the output image can be prevented for example.

Also to achieve the above object, the present invention provides an image processor for converting input grayscale values into output grayscale values having two or more grayscales by dividing an input image into pixel groups each including a plurality of pixels and applying a dither matrix to each of the pixel groups, having: a center of gravity position decision unit for deciding a center of gravity position of the pixel group from the input grayscale value of each pixel included in the pixel group; a positioning unit for positioning the dither matrix so that the center of gravity position of the pixel group substantially matches with a pixel position where a dot is be most likely formed in the dither matrix; and an output unit for acquiring the output grayscale values by corresponding the positioned dither matrix and the input grayscale value of each pixel included in the pixel group.

Also to achieve the above object, the present invention provides an image processing method for converting input grayscale values into output grayscale values having two or more grayscales by dividing an input image into pixel groups each including a plurality of pixels and applying a dither matrix to each of the pixel groups, having: deciding a center of gravity position of the pixel group from the input grayscale value of each pixel included in the pixel group; positioning the center of the dither matrix on the center of gravity position of the pixel group; and outputting the output grayscale values by corresponding the positioned dither matrix and the input grayscale value of each pixel included in the pixel group.

Also to achieve the above object, the present invention provides an image processing method for converting input grayscale values into output grayscale values having two or more grayscales by dividing an input image into pixel groups each including a plurality of pixels and applying a dither matrix to each of the pixel groups, having: deciding a center of gravity position of the pixel group from the input grayscale value of each pixel included in the pixel group; positioning the dither matrix so that the center of gravity position of the pixel group substantially matches with the pixel position where a dot is most likely formed in the dither matrix; and outputting the output grayscale values by corresponding the positioned dither matrix and the input grayscale value of each pixel included in the pixel group.

Also to achieve the above object, the present invention provides an image processing program for causing a computer to execute an image processing for converting input grayscale values into output grayscale values having two or more grayscales by dividing an input image into pixel groups each including a plurality of pixels and applying a dither matrix to each of the pixel groups, the image comprising: a center of gravity position decision processing for deciding a center of gravity position of the pixel group from the input grayscale value of each pixel included in the pixel group; a positioning processing for positioning the center of the dither matrix on the center of gravity position of the pixel group; and an output processing for acquiring the output grayscale values by corresponding the positioned dither matrix and the input grayscale value of each pixel included in the pixel group.

Also to achieve the above object, the present invention provides an image processing program for causing a computer to execute an image processing for converting input grayscale values into output grayscale values having two or more grayscales by dividing an input image into pixel groups each including a plurality of pixels and applying a dither matrix to each of the pixel groups, the image processing comprising: a center of gravity decision processing for deciding a center of gravity position of the pixel group from the input grayscale value of each pixel included in the pixel group; a positioning processing for positioning the dither matrix so that the center of gravity position of the pixel group substantially matches a pixel position where a dot is most likely formed in the dither matrix; and an output processing for acquiring the output grayscale values by corresponding the positioned dither matrix and the input grayscale value of each pixel included in the pixel group.

BRIEF DESCRIPTION OF THE DRAWINGS

FIG. 4 are diagrams depicting the relationship between a cell and a table;

FIG. 5 are diagrams depicting an example of shifting the center of a cell to the center of gravity position of an input image;

FIG. 6 are diagrams depicting examples of input grayscale values and output grayscale values;

FIG. 7 are diagrams depicting examples of input grayscale values and output grayscale values;

FIG. 15 are diagrams depicting an example of an input image and an example of output images;

FIG. 21 are diagrams depicting a dither matrix according to the present embodiment;

FIG. 25 is a flow chart depicting the dot generation processing in the grayscale conversion processing according to the present embodiment;

DESCRIPTION OF THE PREFERRED EMBODIMENTS

Figure 1:
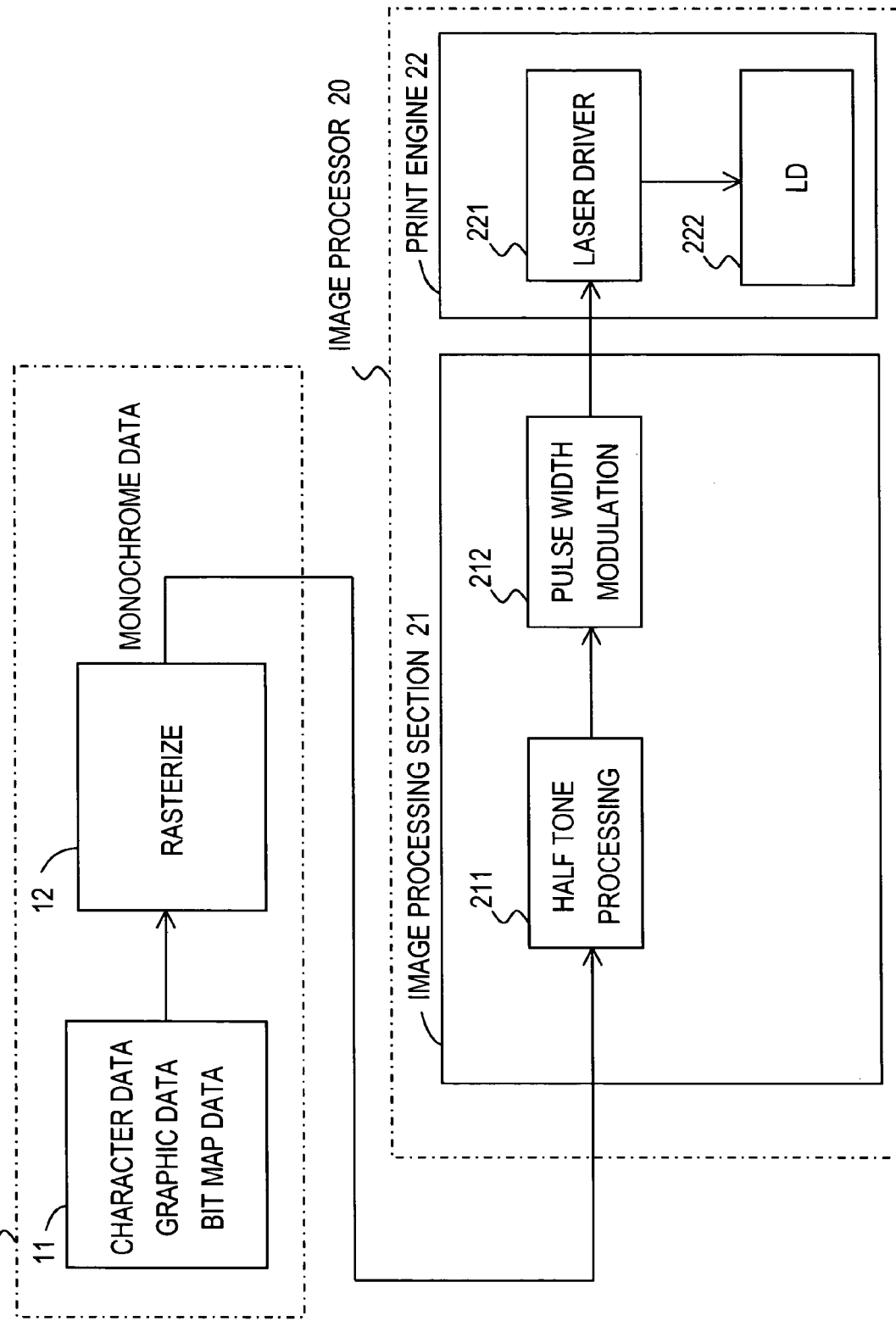
FIG. 1 is a block diagram depicting the entire system to which the present embodiment is applied.

Preferred embodiments of the present invention will now be described with reference to the drawings. FIG. 1 is a diagram depicting the configuration of the entire system to which the present embodiment is applied. This system is comprised of a host computer 10 and an image processor 20.

The host computer 10 is comprised of an application section 11 and a rasterize section 12.

The application section 11 generates the print target data, such as character data and graphic data, using such application programs as a word processor and graphic tools. The rasterize section 12 converts the print target data into 8-bit input image data for each pixel (or each dot), and outputs it to the image processor 20. Therefore the input image data has a grayscale value from "0" to "255" for each pixel. The input data will be described as monochrome data in the following description.

The image processor 20 is comprised of the image processing section 21 and the print engine 22. The image processing section 21 is comprised of the half tone processing section 211 and the pulse width modulation section 212.

The half tone processing section 211, to which input image data from the host computer 10 is input, converts the input image data into output image data having quantized data with two or more levels. The pulse width modulation section 212 generates drive data which indicates whether a laser drive pulse exists or not for each dot of this quantized data, and outputs it to the print engine 22.

The print engine 22 is comprised of a laser driver 221 and a laser diode (LD) 222. The laser driver 221 generates the control data for indicating whether a drive pulse exists or not for the drive data, and outputs it to the LD 222. The LD 222 is driven based on the control data, and by driving the photosensitive drum, an image of print data generated by the host computer 10 is actually printed on print paper.

Figure 2:
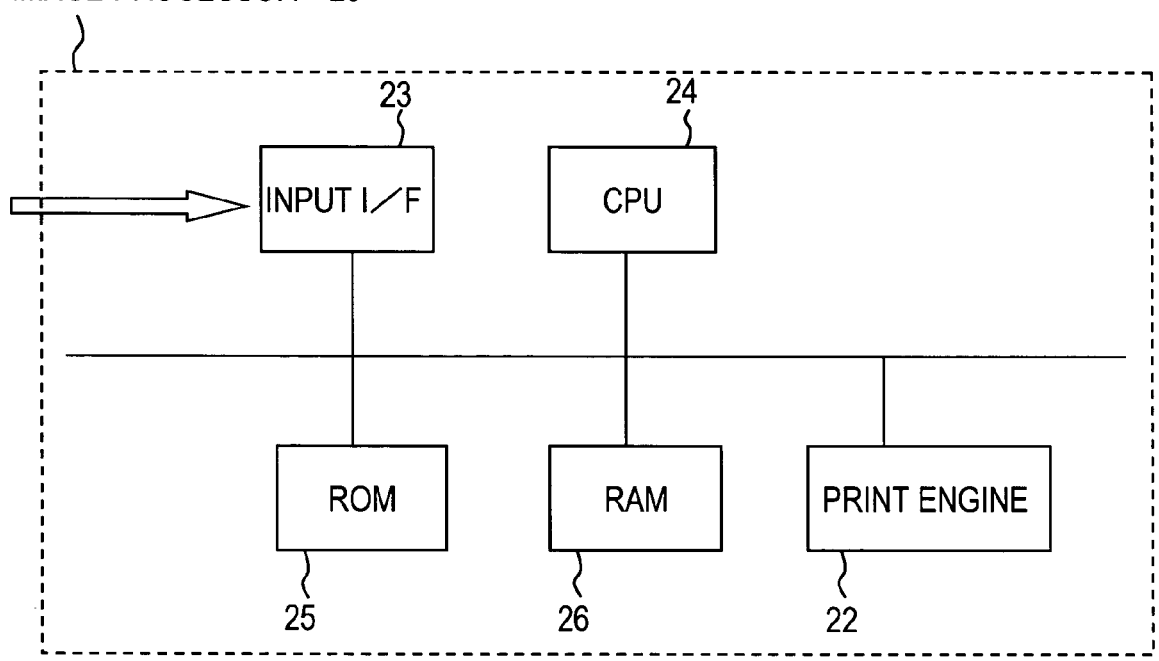
FIG. 2 is a diagram depicting a configuration of an image processor.

The present invention may be applied to the image processor 20 constructed as hardware, as shown in FIG. 1, or may be applied to the software of the image processor 20, as shown in FIG. 2. Here the CPU 24, ROM 25 and RAM 26 in FIG. 2 correspond to the half tone processing section 211 and the pulse width modulation section 212 in FIG. 1.

Now details of the half tone processing according to the present embodiment will be described, but before this, an outline of the present embodiment will be briefly explained.

Figure 3:
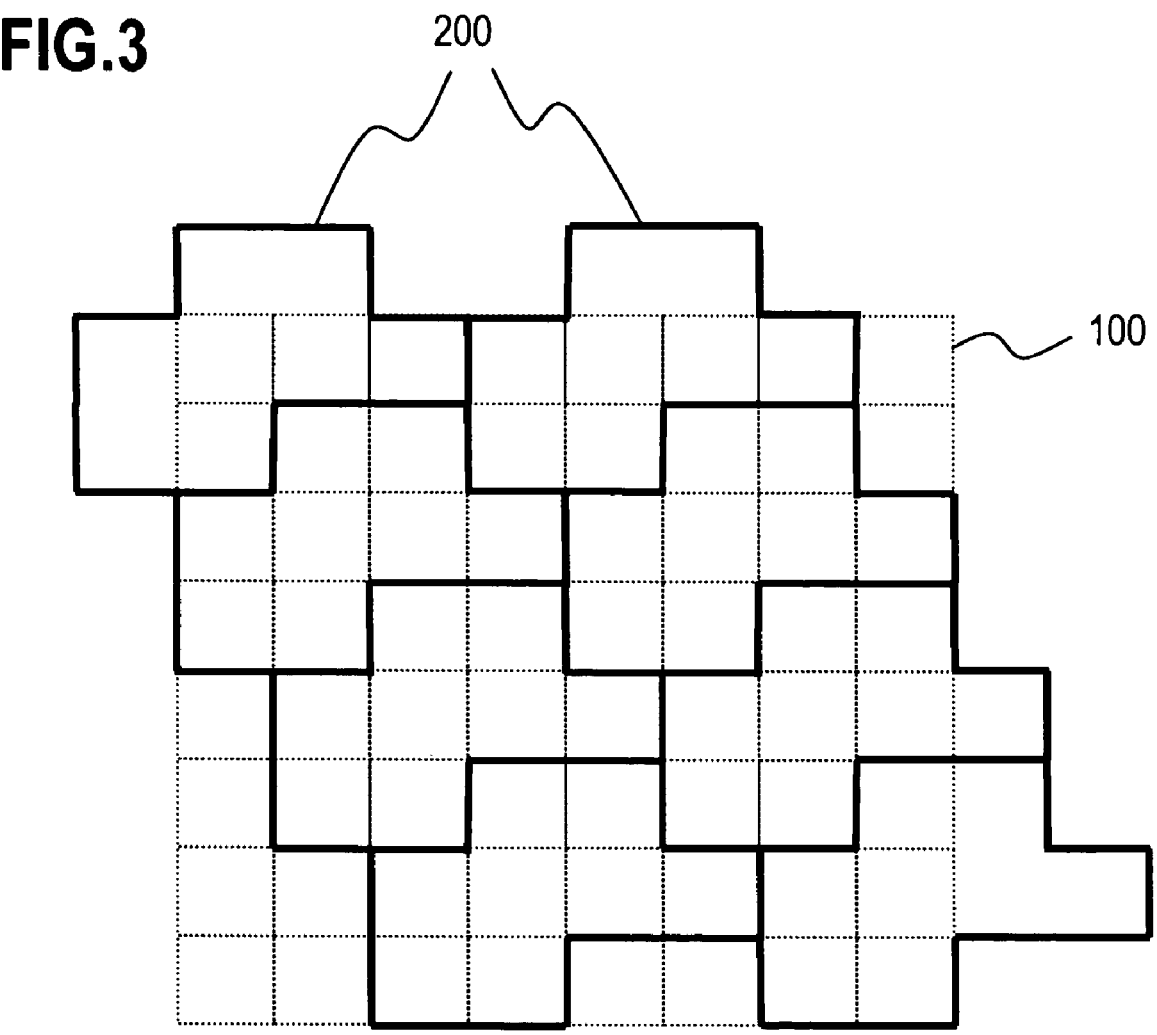
FIG. 3 is a diagram depicting an example of a repeated matrix.

As FIG. 3 shows, the repeated matrix M is sequentially applied to the input image 100. This repeated matrix M has a plurality of multi-value dither matrices 200 (hereafter called "dither matrices"). There are eight dither matrices 200 in the example in FIG. 3, and each dither matrix 200 is applied to a pixel group (hereafter called a "cell"), comprised of a plurality of pixels in the input image 100. In the dither matrix 200, table numbers (indexes) are stored, and a table number to be referred to is determined at each pixel position.

As FIG. 4 shows, the output grayscale value (quantized data) for an input grayscale value at the pixel position is acquired by referring to the table with a number from the determined table number.

The dither matrix 200 is a dot-concentrated type matrix. An index with a smaller number is stored closer to the center of the dither matrix 200, and a table is structured such that as the table number becomes smaller, dots is more likely generated even if the grayscale value is small.

According to the present embodiment, when this dither matrix 200 is applied, the dither matrix 200 is not directly applied to the input image 100, but the center of gravity position is determined from the input grayscale values of the pixels included in the cell, and the dither matrix 200 is shifted so that the pixel position where a dot is most likely generated in the dither matrix 200 substantially matches with the center of the gravity position of the cell (see FIG. 5).

By shifting the dither matrix 200 to the center of gravity position of the cell, dots can be generated at positions most appropriate for reproducing the input image faithfully. As a result, dots faithful to input are generated. Therefore a drop in resolution, which is a problem of the conventional dither method, can be suppressed, and an output image with high resolution can be acquired.

Also according to the present embodiment, after the dither matrix 200 is shifted to the center of gravity position of the cell, the output grayscale value is acquired by referring to the table with each pixel position. Therefore the output grayscale value is "0" at the pixel position of the input grayscale value "0", so a dot is not generated at this pixel position.

According to the above mentioned AAM method, the output grayscale value is allocated sequentially from the pixel closer to the center of gravity position, so a grayscale value other than "0" may be allocated to the pixel position of input grayscale value "0" (see FIGS. 6A and B). Since such allocation does not occur in the present embodiment, a circular dot, which is a problem of the AAM method, is not generated, and the output image is not blurred.

Also according to the present embodiment, if an ideal dot size (or ideal grayscale value, such as a total of input grayscale values of pixels included in the cell) is acquired when processing is being executed in the dither matrix 200, the processing ends at this point. Since processing ends at the point when an ideal grayscale value is acquired as a total output, dots becoming unnecessarily large (thick) can be prevented. In other words, the output density substantially matches between the input image 100 and the output image, and density can be preserved between the input and output images, which is not implemented in the conventional dither method.

If a sufficient ideal grayscale value cannot be acquired as the total output, on the other hand, supplementary processing is performed in the present embodiment, so as to become closer to an ideal dot size. If a sufficient ideal grayscale value cannot be acquired, it means that the input grayscale values are unevenly distributed in the cell, for example (see FIG. 7A). This is because a table with a greater number is applied to the pixel position distant from the center of the dither matrix 200, so the output grayscale value tends to be smaller than the input grayscale value (see FIG. 7B), and as a result, the total of the output grayscale value in the cell becomes much lower than the ideal grayscale value. Details of the supplementary processing will be explained later.

Figure 8:
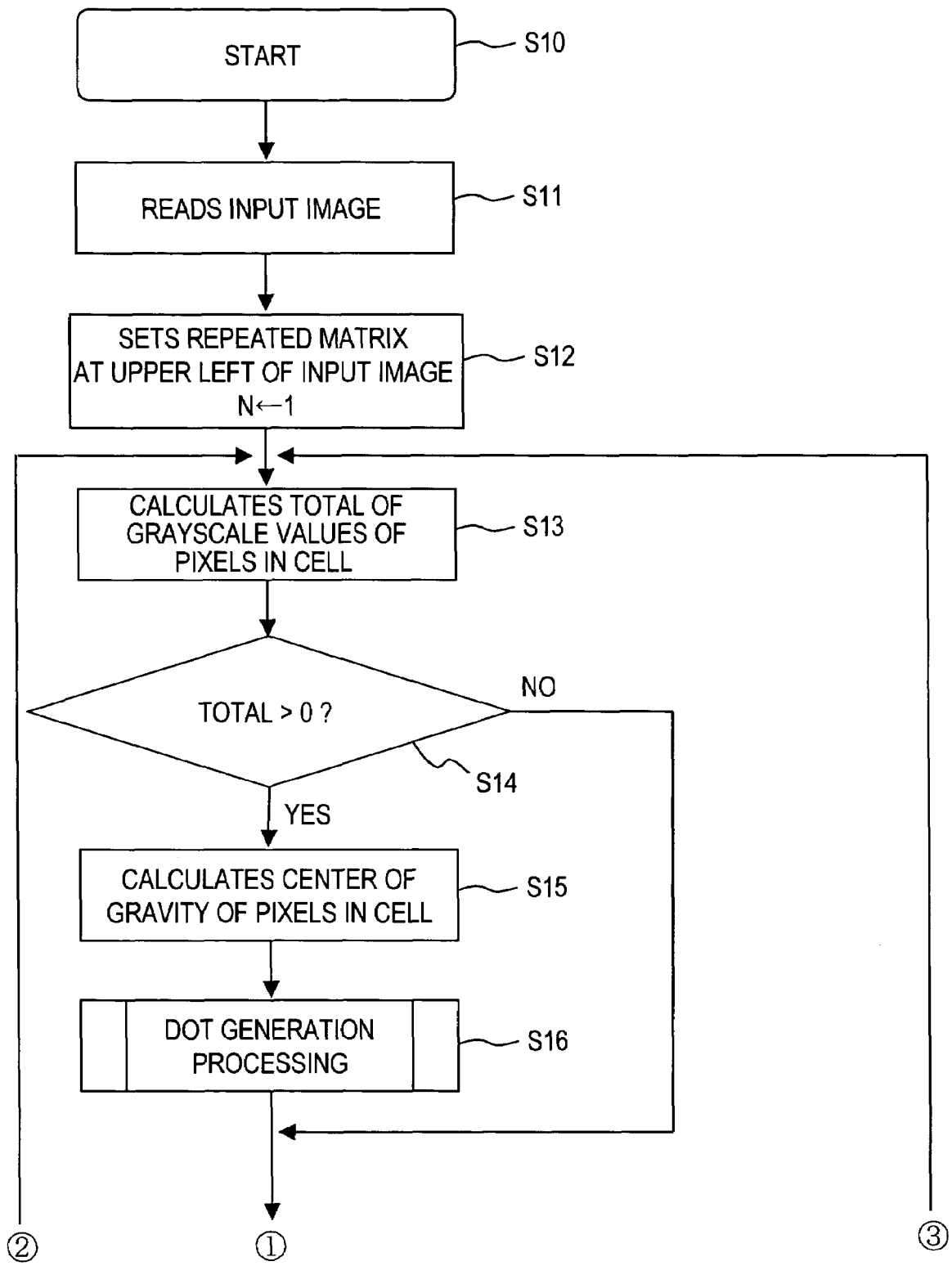
FIG. 8 is a flow chart depicting the operation of the entire processing.
Figure 9:
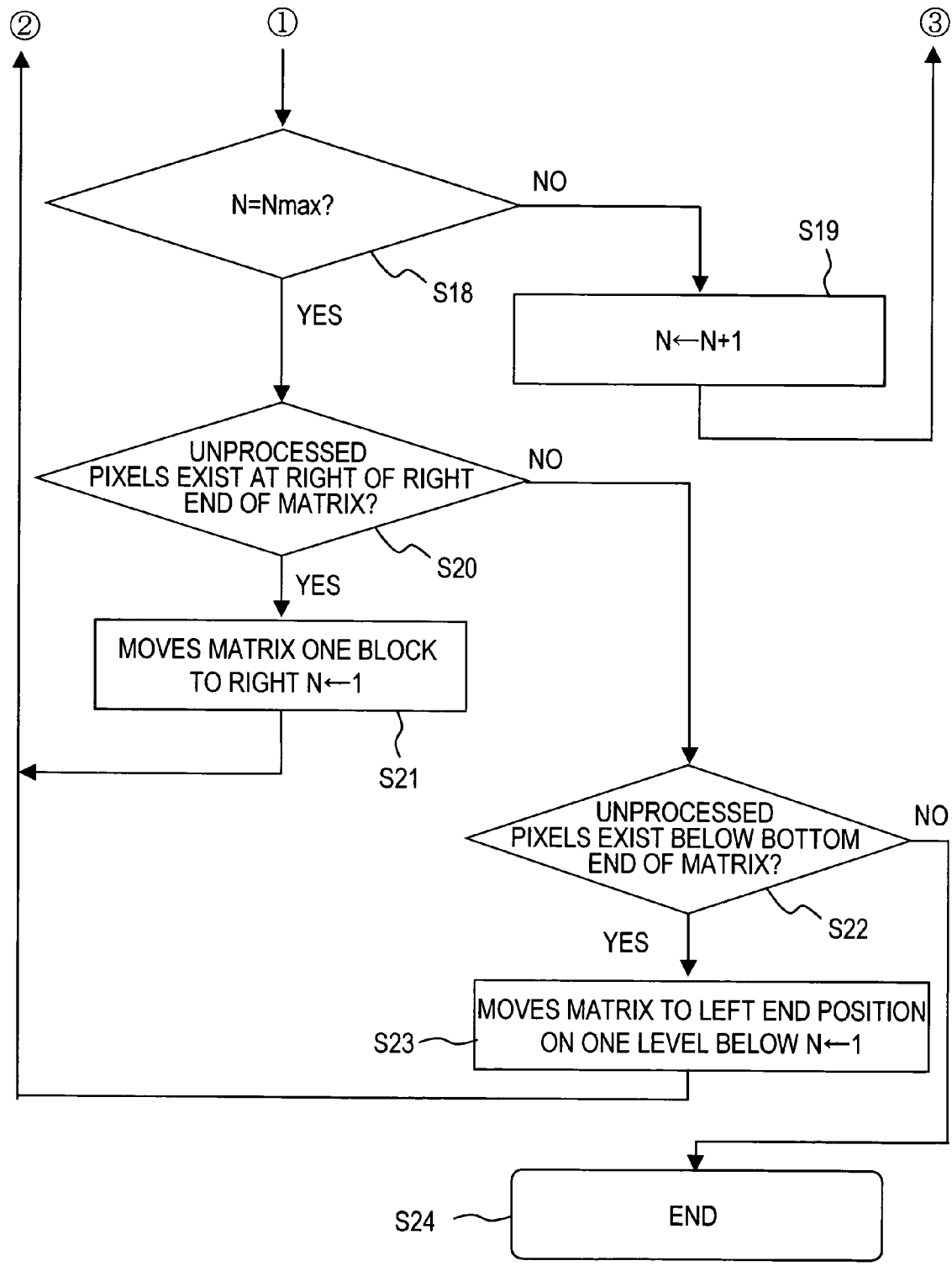
FIG. 9 is a flow chart depicting the operation of the entire processing.

Now an embodiment of the processing according to the present embodiment will be described. FIG. 8 and FIG. 9 are flow charts depicting the operation of the entire processing. In this description this processing is assumed to be executed by the CPU 24. This may, of course, be executed by the half tone processing section 211.

First the CPU 24 starts processing by reading the program for executing this processing from the ROM 25 (S10).

Then the CPU 24 reads the input image 100 (S11). For example, the CPU 24 stores the input image 100 in the RAM 26.

Then the CPU 24 sets the repeated matrix M at the upper left of the input image 100 (S12). This is for performing processing sequentially from the upper left of the input image 100 in the raster direction. The CPU 24 stores "1" to "N" for indicating the number (Nth) of the dither matrix 200.

Then the CPU 24 calculates the total of the input grayscale values in the cell to which the N-th dither matrix 200 is applied (S13). This is required for calculating the center of gravity.

Then the CPU 24 judges that the total is greater than "0" (S14). The total "0" is the case when all the input grayscale values of the pixels in the cell are all "0". Therefore in this case (in the case of NO), the processing moves to S18 (FIG. 9) without performing such processing as dot generation. Compared with the case of processing all of these steps, the process is skipped, so the calculation amount can be decreased for that amount.

When the total of the grayscale values is greater than "0" (YES in S14), the CPU 24 calculates the center of gravity of the pixels in the cell (S15). This is required to judge the location to which the dither matrix 200 is shifted. If the center of gravity position is (X center of gravity, Y center of gravity), the calculation formula is as follows.

$X$ center of gravity=$\Sigma\{(X$ coordinate of each pixel)× (grayscale value of each pixel)$\}$/total of grayscale values in cell $Y$ center of gravity=$\Sigma\{(Y$ coordinate of each pixel)× (grayscale value of each pixel)$\}$/total of grayscale values in cell These formulas are stored in the ROM 25, for example, and are read by the CPU 24 when this processing is performed. For example, in the case of FIG. 5B, if the pixel at the upper left is coordinate (0, 0) and the right direction is the X coordinate and the down direction is the Y coordinate, then the center of gravity position is (X center of gravity, Y center of gravity)=(1, 0).

Figure 10:
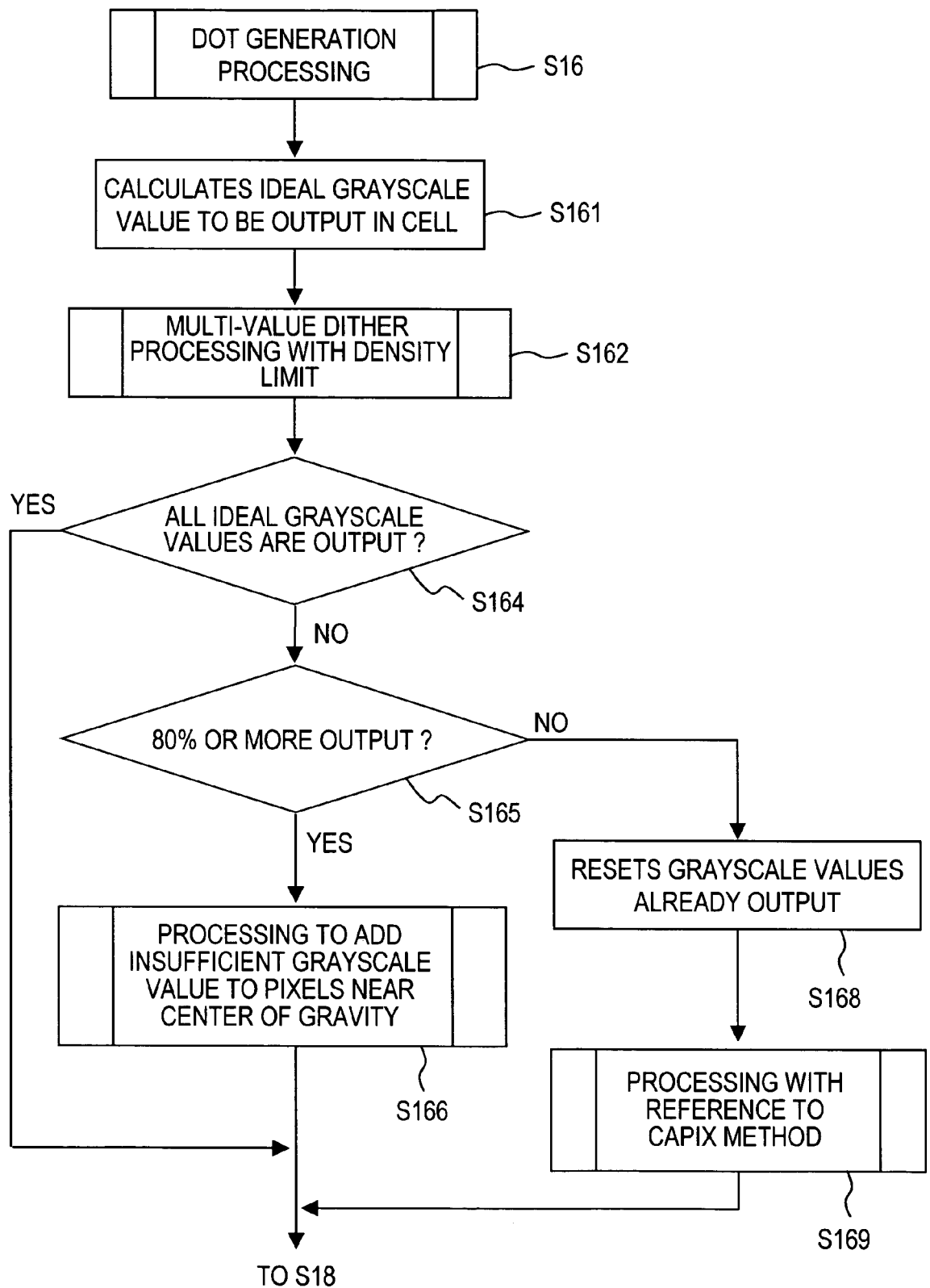
FIG. 10 is a flow chart depicting the operation of the dot generation processing.

Then the CPU 24 performs dot generation processing (S16). By this dot generation processing, quantized data is acquired. The above mentioned shift of dither matrix to the center of gravity position and supplementary processing are also performed within the dot generation processing. FIG. 10 shows the details of the dot generation processing.

First the CPU 24 calculates the ideal grayscale value to be output to the cell (S161). The ideal grayscale value is determined from the total of the input grayscale values of the pixels in the cell using a predetermined function. For example, the ideal grayscale value is the total value of the input grayscale values in the cell.

Figure 11:
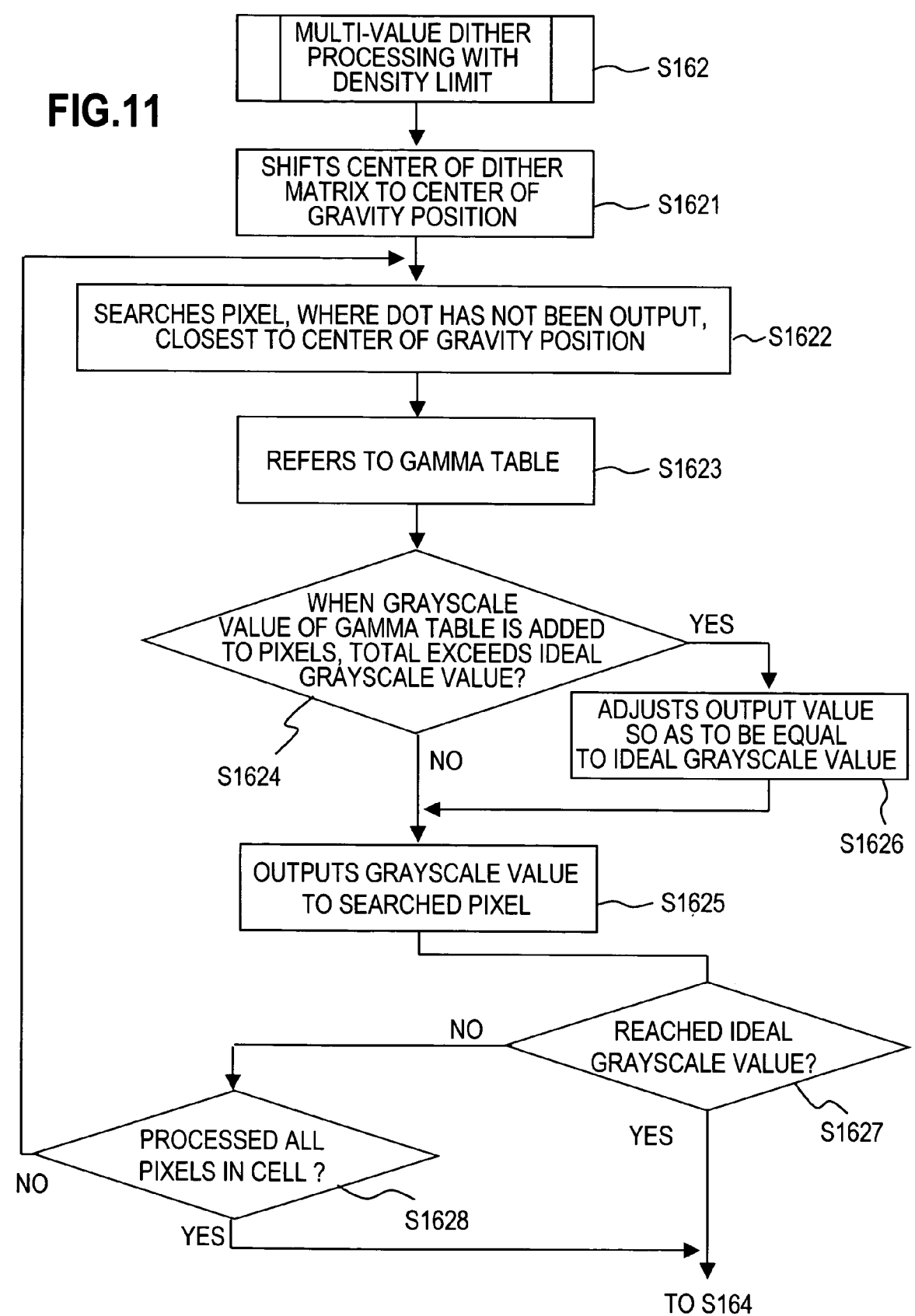
FIG. 11 is a flow chart depicting the multi-value dither processing with a density limit.

Then the CPU 24 performs multi-value dither processing with a density limit (S162). FIG. 11 shows the details of multi-value dither processing with a density limit.

First the CPU 24 shifts the center of the dither matrix 200 to the center of gravity position of the cell determined in S15 (S1621). In the case of the above example, the center is shifted as shown in FIG. 5D.

Then the CPU 24 searches a pixel closest to the center of gravity position to which a dot has not been output (S1622). In the case of the example in FIG. 5D, the position at (1, 0) is searched.

Then the CPU 24 refers to the gamma table corresponding to the searched pixel position, and acquires the output grayscale value (S1623). For example, the CPU 24 refers to the tables shown in FIG. 4B.

The CPU 24 at this time judges whether the total of the output grayscale values exceeds the ideal grayscale value (S1624). As described above, this is for preventing the generation of a dot larger than the ideal size (output grayscale value exceeding the ideal grayscale value).

Therefore if the total value is greater than the ideal grayscale value (YES), the output grayscale value is adjusted so as to be equal to the ideal grayscale value (S1626). If the total output grayscale value does not exceed the ideal grayscale value (NO in S1624), processing moves to S1625 without adjusting the output grayscale value.

And in S1625, the CPU 24 outputs the output grayscale value to the actually searched pixel (S1625).

Then the CPU 24 judges whether the total output grayscale value reached the ideal grayscale value (S1627), and if reached, the multi-value dither processing with a density limit ends (to S164). In this case, the ideal dot size is acquired.

If the total output grayscale value does not reach the ideal grayscale value (NO in S1627), and all the pixels in the cell have not been processed (NO in S1628), the CPU 24 searches a pixel to which a dot has not been output in the cell (S1622), and the above processing is repeated.

Even if the ideal grayscale value is not reached, the multi-value dither processing with a density limit ends when all the pixels in the cell to which the dither matrix 200 is applied are processed (YES in S1628). In this case, the total output grayscale value has not reached the ideal grayscale value, and sufficient sized dots are not output. This is adjusted by the later mentioned supplementary processing.

When the multi-value dither processing with a density limit ends, the processing returns to FIG. 10, and it is judged whether all the ideal grayscale values were output by comparing the total of the output grayscale values which were output in this processing and the ideal grayscale values (S164).

When all the ideal grayscale values were output (YES), it means that the ideal dot size in the cell (e.g. output grayscale value which is the same as the total of input grayscale values in the cell) was output, and a series of processing according to the present embodiment ends, and the processing moves to dither matrix 200 shift processing (processing after S18 in FIG. 9). For example, this is the case when the output shown in FIG. 6D is acquired.

If all the ideal grayscale values were not output (NO in S164), the CPU 24 performs the above mentioned supplementary processing. For example, the supplementary processing is performed when the output shown in FIG. 7B, for example, is acquired.

The supplemental processing is as follows. As FIG. 10 shows, the CPU 24 judges whether 80% or more of ideal grayscale values were output as the output grayscale values (S165). If not (NO), the output grayscale values acquired by the multi-value dither processing with a density limit (S162) are reset (S168), and processing with reference to the CAPIX method (S169) is performed to acquire output grayscale values separately.

In the case of the example in FIG. 7B, since the total of the output grayscale values in the cell is "100" and the total of the input grayscale values in the cell is "400", then the output grayscale values that were output are only 50%. In this case, processing with reference to the CAPIX method (S169) is performed.

Even if 80% of the ideal grayscale values could be output (YES in S165), this does not necessarily mean that all the ideal grayscale values were output in the cell, so the CPU 24 performs processing to add an insufficient portion of grayscale values (S166).

"80%" or more in S165 is just an example, another value may be used.

First the processing with reference to the CAPIX method (S169) will be described. The processing with reference to the CAPIX method is a processing of determining the total of the input grayscale values in the cell to which the dither matrix 200 is applied, and reallocating the high output grayscale values to pixels with high input grayscale values with priority. Since the output grayscale values are allocated to each pixel and dots are generated at the pixels, a high resolution output can be acquired.

Figure 12:
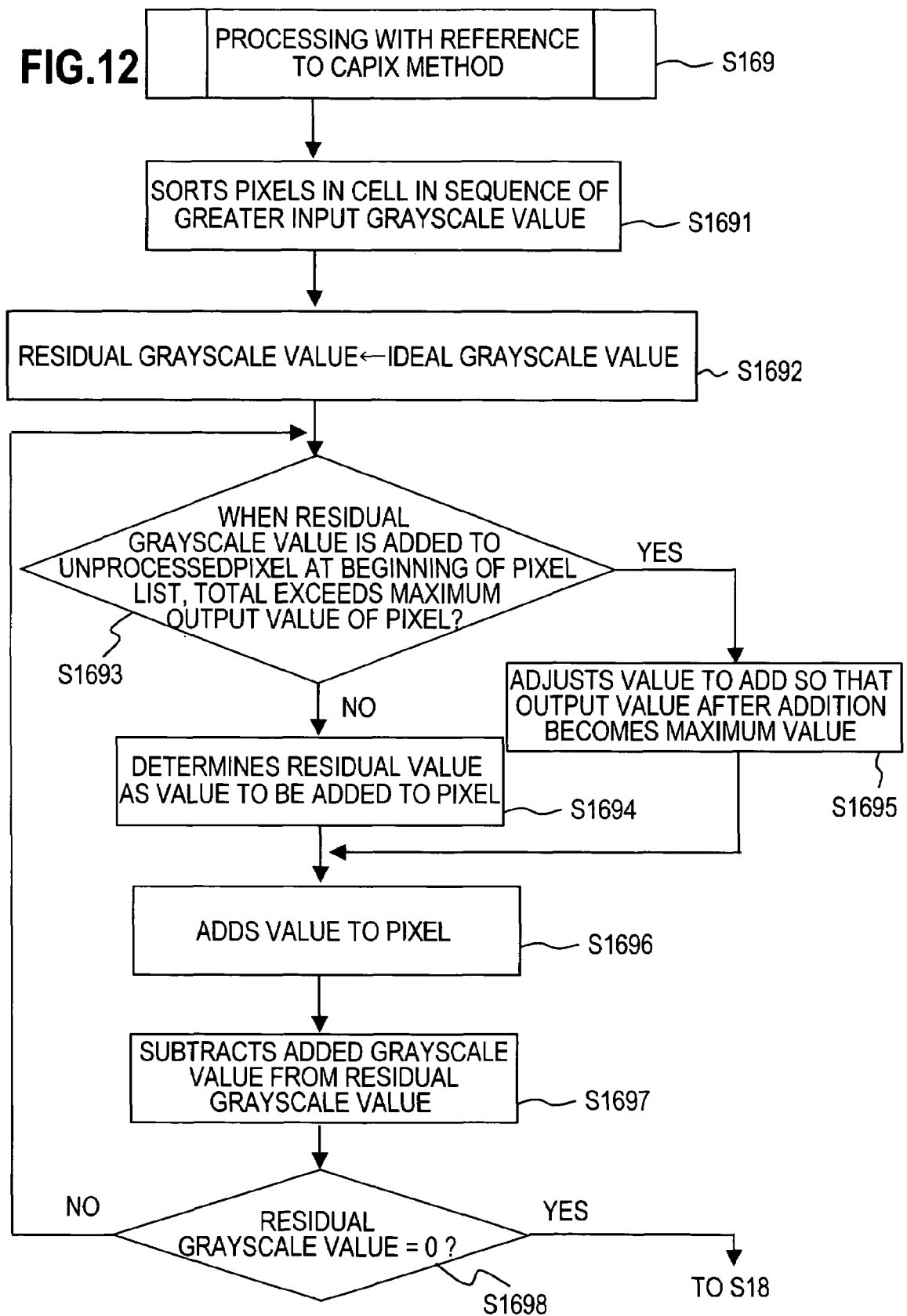
FIG. 12 is a flow chart depicting the operation of the processing with reference to the CAPIX method.

FIG. 12 shows the details thereof. First the CPU 24 sorts the pixels in the cell in the sequence of greater input grayscale value (S1691). For example, in the case of the example in FIG. 7A, two pixels of which the input grayscale value is "200", then seven pixels of which the input grayscale value is "0" are sorted.

Then the CPU 24 substitutes the residual grayscale value with the ideal grayscale value (S1692). If the ideal grayscale value is the total of the input grayscale values, then the ideal grayscale value is "400" in the case of the example in FIG. 7A, and this value becomes the residual grayscale value.

Then the CPU 24 adds the residual grayscale value to the first unprocessed pixel of the sorted pixel list, and judges whether this value exceeds the maximum output value of the pixel (S1693). The maximum output value of an 8-bit output is "255".

If the maximum value is exceeded (YES), the CPU 24 adjusts the add value so that the added result becomes equal to the maximum value (S1695), and adds this value to the first unprocessed pixel (S1696). If the maximum value is not exceeded (NO in S1693), the CPU 24 regards the residual grayscale value as the add value to the pixel (S1694), and adds this value to the first unprocessed pixel (S1696).

In the case of the example in FIG. 7A, if the residual grayscale value "400" is added to one of the pixels of which the input grayscale value is "200", the value exceeds the maximum grayscale value "255" (YES in S1693), so the add value is adjusted to "255" (S1695), and "255" is added to this pixel (S1696).

Then the CPU 24 subtracts the added grayscale value from the residual grayscale value (S1697), and processing is repeated until the residual grayscale value becomes "0" (S1698).

In the case of the example in FIG. 7A, the residual grayscale value is "145" (=400−255), and this value is added to one of the unprocessed pixels of which the input grayscale value is "200", and processing ends. FIG. 7C shows the output example after processing.

Figure 13:
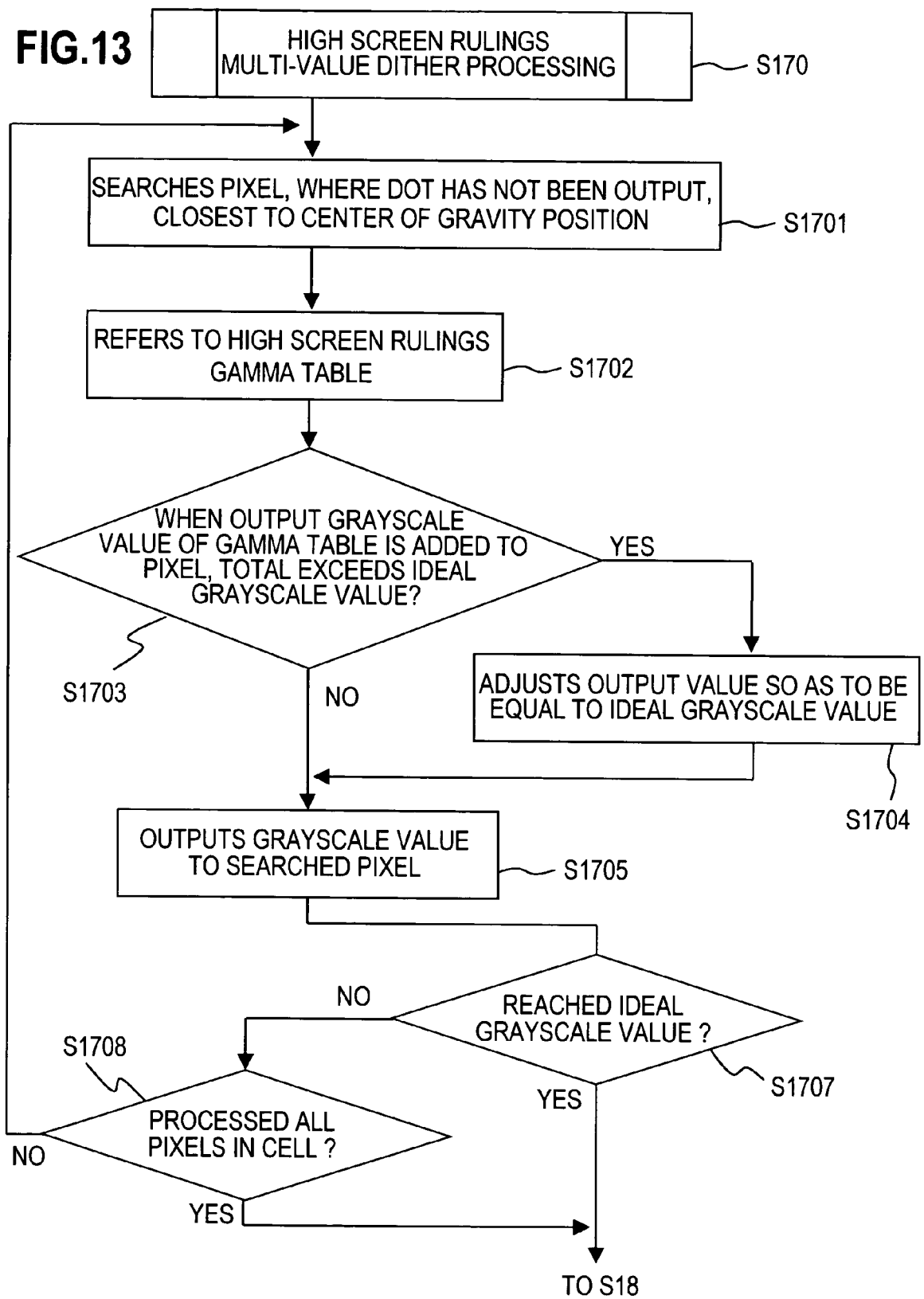
FIG. 13 is a flow chart depicting the operation of the high screen rulings multi-value dither processing.

This processing with reference to the CAPIX method is just an example, and the high screen rulings dither method (S170) shown in FIG. 13, for example, may be used. In the high screen rulings multi-value dither processing, dither matrix 200, where table numbers are arranged in such a way that the sampling point increases, is used. An example is the dither matrix 200 in FIG. 4A, where the index number of table number "1" is also in the position of the table number "8". Dots can be more likely reproduced even if input is complicated, and a high resolution output can be acquired.

The high screen rulings multi-value dither processing is substantially the same as the multi-value dither processing with a density limit (FIG. 11), except for shifting the center of the dither matrix 200 to the center of gravity position of the cell.

The CPU 24 searches a pixel to which a dot has not been output (S1701), and refers to the table for the searched pixel (S1702). The output grayscale values are acquired from the table, and if the total thereof exceeds the ideal grayscale value (YES in S1703), then the CPU 24 adjusts the output grayscale value so as to be equal to the ideal grayscale value (S1704), and outputs the output grayscale value to the searched pixel (S1705).

If the ideal grayscale value is not exceeded (NO in S1703), then the CPU 24 outputs the output grayscale value acquired from the table to the searched pixel (S1705).

If the total of the output grayscale values reach the ideal grayscale value (YES in S1707), or if all the pixels in the cell are processed even if the total did not reach the ideal grayscale value (NO in S1707, YES in S1708), the high screen rulings multi-value dither processing ends.

If all the pixels in the cell have not been processed (NO in S1708), the CPU 24 searches a pixel to which a dot is output again (S1701), and repeats the above processing. The high screen rulings multi-value dither method is faster compared with the processing with reference to the CAPIX method, since sort processing (S1691) is not executed.

The processing with reference to the CAPIX method (S169) and the high screen rulings multi-value dither processing (S170) are both options when 80% or more of the ideal grayscale value has not been output. If 80% or more have been output (YES in S165 in FIG. 10), then the CPU 24 performs addition processing to add the insufficient grayscale value to pixels near the center of gravity (S166).

Figure 14:
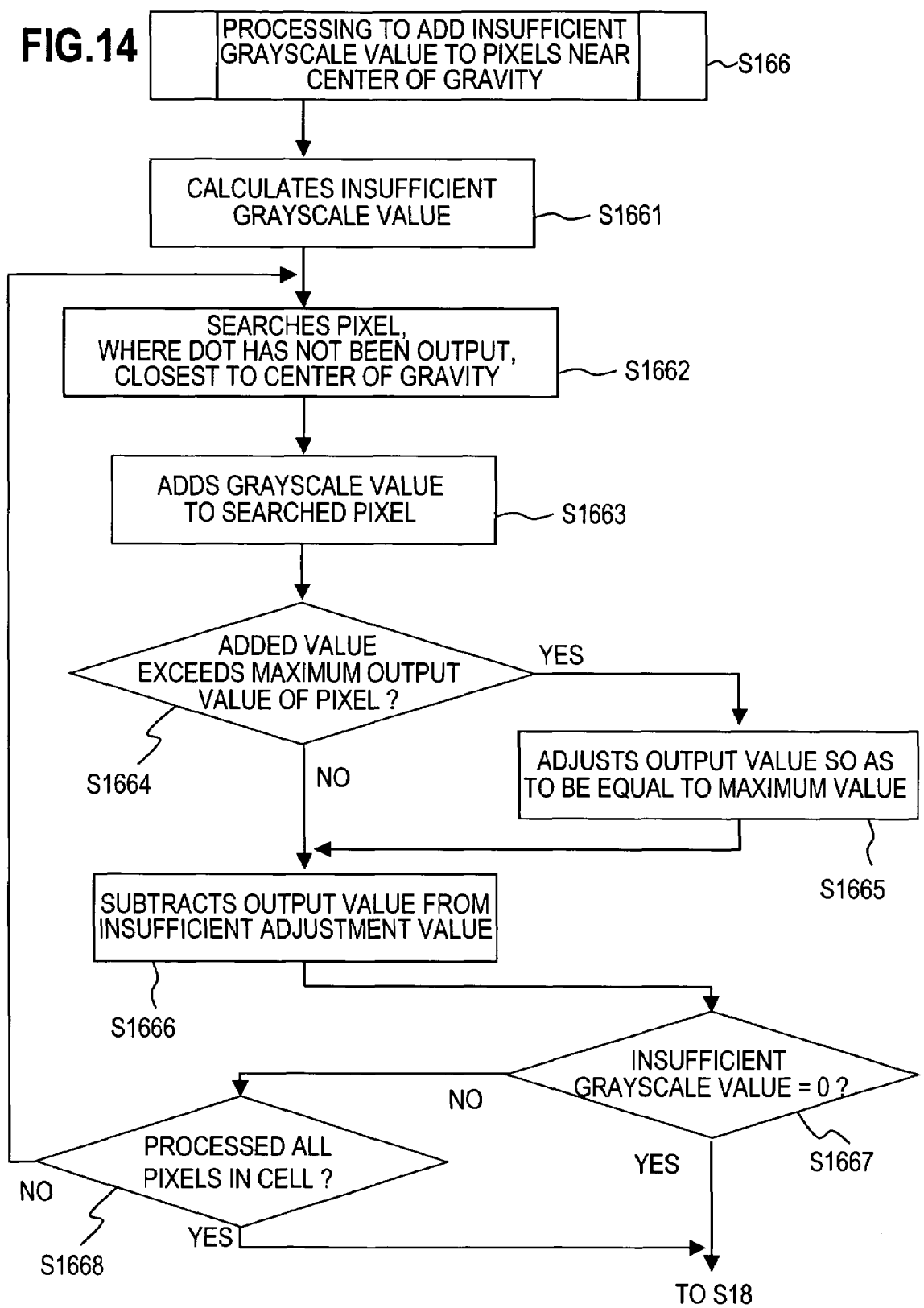
FIG. 14 is a flow chart depicting the operation of the processing to add an insufficient grayscale value to pixels near the center of gravity.

FIG. 14 shows details of the addition processing. First the CPU 24 calculates the insufficient grayscale value (S1661). For this calculation, the total value of the output grayscale values, which have actually been output thus far, is subtracted from the ideal grayscale value.

Then the CPU 24 searches a pixel closest to the center of gravity to which a dot has not been output (S1662), and adds the insufficient grayscale value to the searched pixel (S1663). If the add value exceeds the maximum output value ("255" in the case of 8-bit output) at this time (YES in S1664). The add value is adjusted to be equal to the maximum value (S1665).

When the add value does not exceed the maximum output value (NO in S1664) or after adjustment of the output value (S1665), the CPU 24 subtracts the add value from the insufficient grayscale value (S1666). And when the insufficient grayscale value after the subtraction becomes "0" (YES in S1667), or when all the pixel in the cell are processed (YES in S1668) even if the insufficient grayscale value does not become "0" (NO in S1667), this addition processing ends, otherwise (NO in S1668) the processing moves to S1662 and the same processing is repeated.

This addition processing (S166) or processing with reference to the CAPIX method (S169) or high screen rulings multi-value dither processing (S170) ends, dot generation processing ends (see FIG. 10), and shift processing, for applying the dither matrix 200 to another cell area (see FIG. 9), is performed.

In other words, the CPU 24 judges whether the number "N" of the dither matrix 200 is "Nmax" or not (S18). "Nmax" is a number of the dither matrices 200 included in the repeated matrix M. In the case of the example in FIG. 3, "Nmax" is "8". Here the dither matrix 200 is applied to all the pixels in the repeated matrix M, and it is judged whether the processing ended.

If application of the dither matrix 200 to all the pixels has not been completed in the repeated matrices M (NO), then "1" is added to the dither matrix number "N", and the above processing is repeated (S13 to S18).

When application of the dither matrices 200 to all the pixels is completed in the repeated matrix M (YES in S18), it is judged whether an unprocessed pixel exists at the right from the right end of the repeated matrix M (S20). If an unprocessed pixel exists (YES), the repeated matrix M is shifted to the right, and the above mentioned processing is repeated with the dither matrix number "N" as "1" (S13 to S18).

If there is no unprocessed pixel (NO in S20), the processing of one line of an input image 100 has been completed, so the CPU 24 judges whether an unprocessed pixel exists below the bottom end of the repeated matrix M (S22).

If an unprocessed pixel exists below the bottom end of the repeated matrix M (YES), the repeated matrix M is shifted to the very left position one level below (S23), and the above mentioned processing is repeated (S13 to S18). If no unprocessed pixel exists below the bottom end (NO in S22), processing for all the pixels of one page of the input image 100 has been completed, and the series of the above mentioned processing ends (S24).

FIG. 15 is an example of the output image with respect to the input image. For the fine line of the input image (see FIG. 15A), the line is disconnected here and there in the output image by the conventional multi-value dither method, as shown in FIG. 15B, but such a problem is not generated in the output image by the present embodiment, as shown in FIG. 15C.

Also in the case of the output image by the conventional multi-value dither method (FIG. 15B), the line becomes thicker in some parts than in the input image, but this problem is not generated either in the output image by the present embodiment. In other words, the output image by the present embodiment is faithful to input.

The other effects of the present embodiment, in addition to the above, are as follows. In the case of the present embodiment, the dither matrix 200 is applied to each cell of the input image 100 only once, so high-speed processing can be implemented compared with the case of repeating applying the dither matrix 200 a plurality of times.

Also it is not necessary to record a plurality of dither patterns having different dot growth characteristics in the memory (ROM 25 or RAM 26) of the image processor 20, so the recording capacity of the memory can be decreased, and the cost of the image processor 20 can be decreased.

Figure 16:
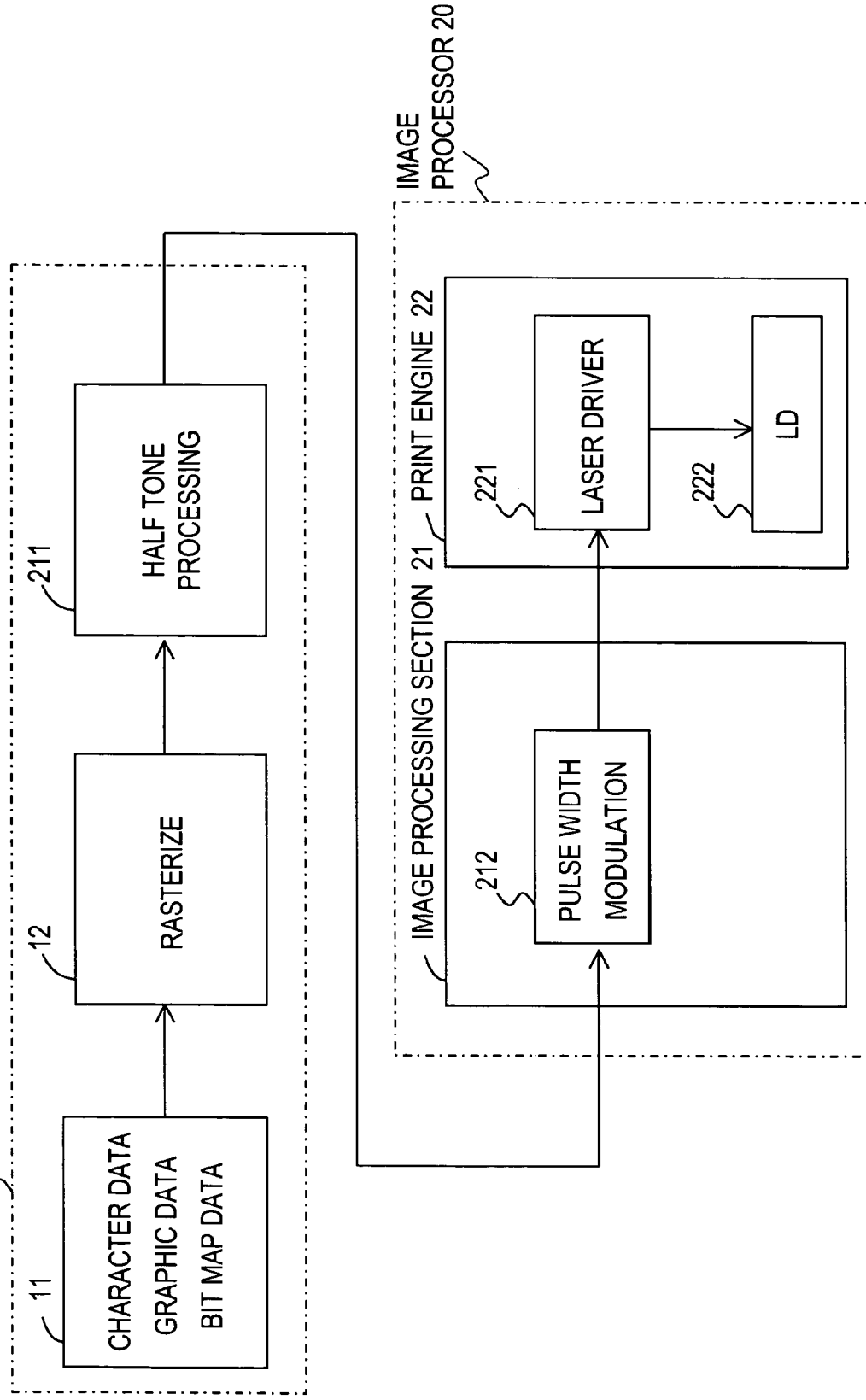
FIG. 16 is a block diagram depicting another system to which the present embodiment is applied.

The above example was described assuming that half tone processing, according to the present embodiment, is applied by the image processor 20, but may be performed by the host computer side 10, as shown in FIG. 16. In this case, the host computer 10 functions as the image processor according to the present embodiment.

Figure 17:
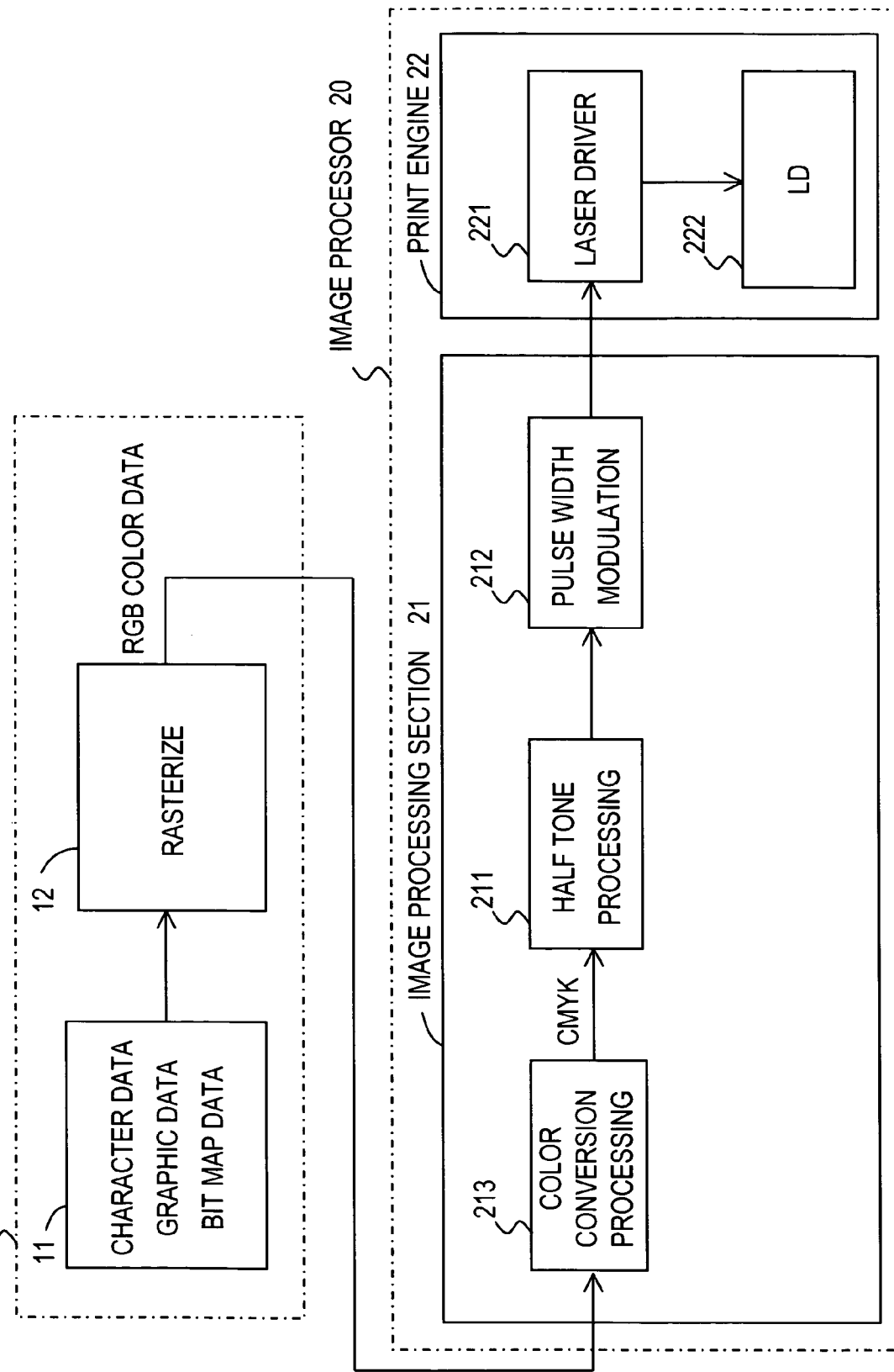
FIG. 17 is a block diagram depicting another system to which the present embodiment is applied.

Also the above example was described assuming that the input image data is monochrome data. But the present embodiment may be applied to CMYK color data, as shown in FIG. 17. In this case, RGB color data is output from the rasterize section 12, and is converted into CMYK color data by the color conversion processing section 213 in the image processor 20.

At this time in the present embodiment, the repeated matrix M is applied to each CMYK plane, and the above mentioned processing is repeated for each plane. The dither matrices 200 in the matrix M are arrayed so that moire is not generated.

The present embodiment may also be applied to the case when the color conversion processing section 213 is installed in the host computer 10, or the case when the color conversion processing 213 and the half tone processing section 211 are installed in the host computer 10. In both cases, functional effects similar to the above are implemented.

Also in the above example, the table numbers to be referred to are stored in the multi-value dither matrix 200, but the thresholds may be directly stored in the dither matrix 200. In this case as well, functional effects similar to the above example are implemented.

Also the above example was described assuming the number of grayscales of the input image is 256 (8 bits) from "0" to "255", and quantized data also is 256 grayscales (8 bits). But for 128 grayscales (7 bits), 512 grayscales (9 bits) or other various grayscales as well, similar functional effects are implemented.

Also in the above example, the case of a printer was described as an example of the image processor 20. But the image processor 20 may be a copier, facsimile or composite machine having these functions, and the host computer 10 may be a portable information terminal, such as a portable telephone, PDA (Personal Digital Assistant) or digital camera.

Second Embodiment

Figure 18:
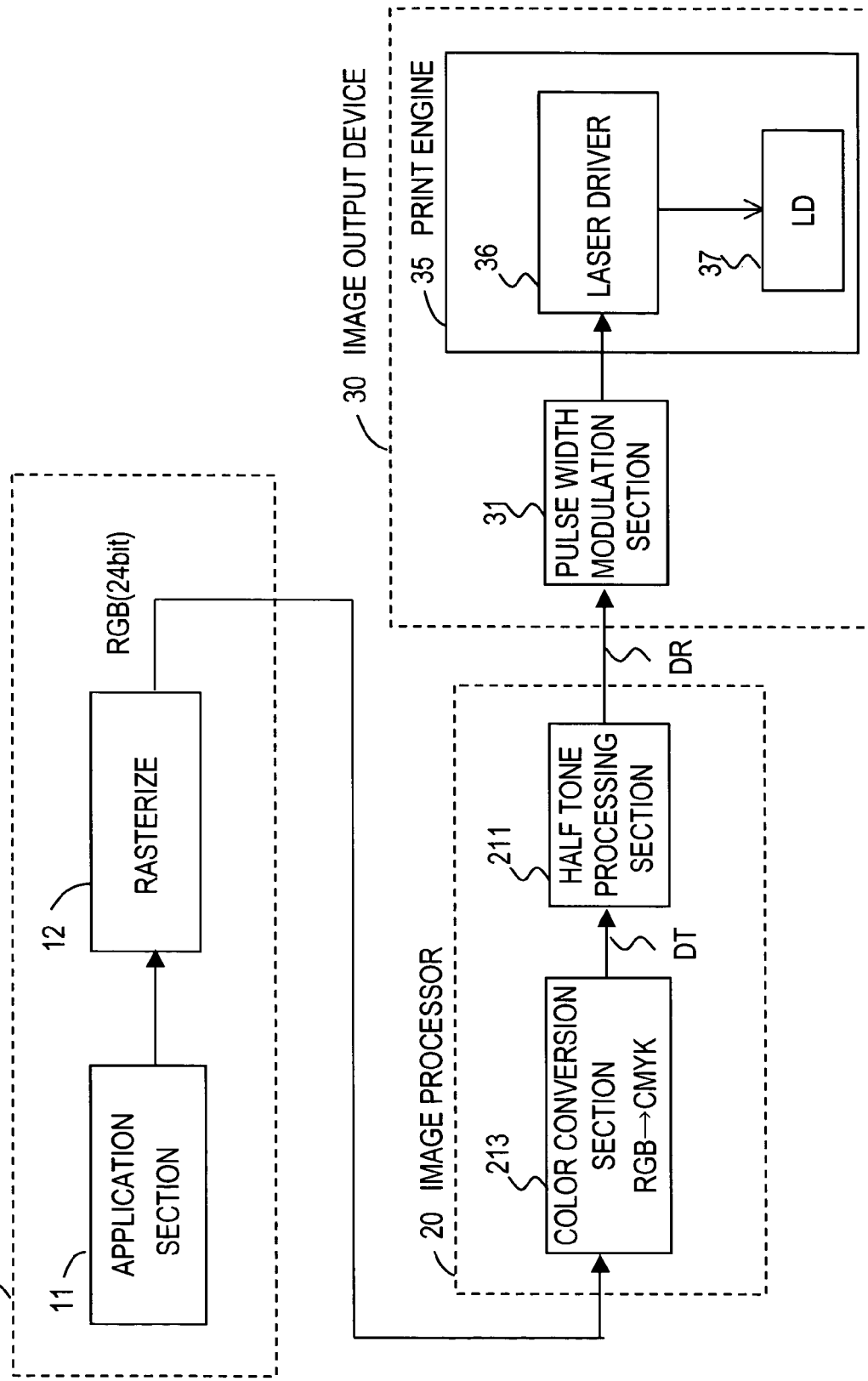
FIG. 18 is a block diagram depicting the entire system including the image processor according to the second embodiment.

FIG. 18 is a block diagram depicting the entire system, including the image processor according to the second embodiment. This system is comprised of the image input device 10, image processor 20 and image output device 30. These devices are basically computers or devices controlled by a computer, and are operated by predetermined programs executed under a predetermined operating system.

The image input device 10 is comprised of an application section 11 and rasterize section 12. The application section 11 generates print target data, such as character data, graphic data and bit map data. For example, in the image input device 10, an application program, such as word processor or graphic tool, is utilized, and keyboard, not shown, is operated, character data, graphic data and bit map data are generated. And the application section 11 outputs this generated data to the rasterize section 12. The image input device 10 may input image data which is output from an image data acquisition equipment, such as a scanner and digital still camera, which are not illustrated, and supply this input image data to the rasterize section 12.

The rasterize section 12 converts the print target data supplied from the application section 11 into a plurality of colors of image data for each pixel, and outputs the data. In the present embodiment, an 8-bit multi-grayscale value image data is output for each pixel for each color of R (red), G (green) and B (blue). In other words, each pixel has 24-bit image data. Therefore the output image data has 256 grayscales from "0" to "255" for each pixel. The image data generation processing in the rasterize section 12 is performed by a print driver, for example, which is not illustrated, installed in the image input device 10. The image data to be output from the rasterize section 12 is output to the image processor 20.

The image processor 20 is basically a computer, and is comprised of a color conversion section 213 and a half tone processing section 211. The image processor 20 performs color conversion processing and half tone processing for the image data which is output from the image input device 10, and outputs predetermined grayscale data DR to the image output device 30.

The color conversion section 213 receives the image data which has 256 types of grayscale values and 8 bits for each RGB (total of 24 bits), which is output from the image input device 10, and performs color conversion processing according to the color components of the color material which is output from the image output device 30. In the present embodiment, color conversion is performed from RGB to CMYK image data DT. Here C is cyan, M is magenta, Y is y yellow and K is black. In the case of monochrome image data, this color conversion processing need not be performed.

The half tone processing section 211 inputs CMYK image data DT which is output from the color conversion section 213, converts it into quantized data (2 or more types of multi-value grayscale values, such as 2 or 128) for each pixel, and outputs this converted quantized data (predetermined grayscale data DR) to the image output device 30 as the output grayscale value for each pixel. The half tone processing section 211 performs various image processing according to the present embodiment. Specific image processing contents will be described later.

The image output device 30 is comprised of a pulse width modulation section 31 and a print engine 35, and the print engine 35 is further comprised of a laser driver 36 and a laser diode (LD) 37. In the image output device 30, the print engine 35 is driven according to the output grayscale value of each pixel which is output from the image processor 20, and by this print engine 35 dots of each color component are formed on the recording medium, such as print paper, based on predetermined half tone dot positions according to the AM screen to be used. By these formed dots, a half tone image is created, and the image is output as printed matter.

The pulse width modulation section 31 inputs the output grayscale value which is output from the half tone processing section 211, and generates laser drive pulse data from this output grayscale value. And outputs this drive pulse data to the laser driver 36. The laser driver 36 generates the drive pulses to drive the laser diode 37 from this drive pulse data which was input, and outputs them to the laser diode 37. The laser diode 37 is driven based on the control pulses which are output from the laser driver 36, and a photosensitive drum and transfer belt, which are not illustrated, are also driven, and finally the predetermined number of dots with predetermined color components are output at predetermined positions on the recording medium, such as print paper, according to the pulse width and number of pulses of the drive pulse. In this way, each color dot is formed on the recording medium, and data to be the print target generated by the image input device 10 is printed.

Figure 19:
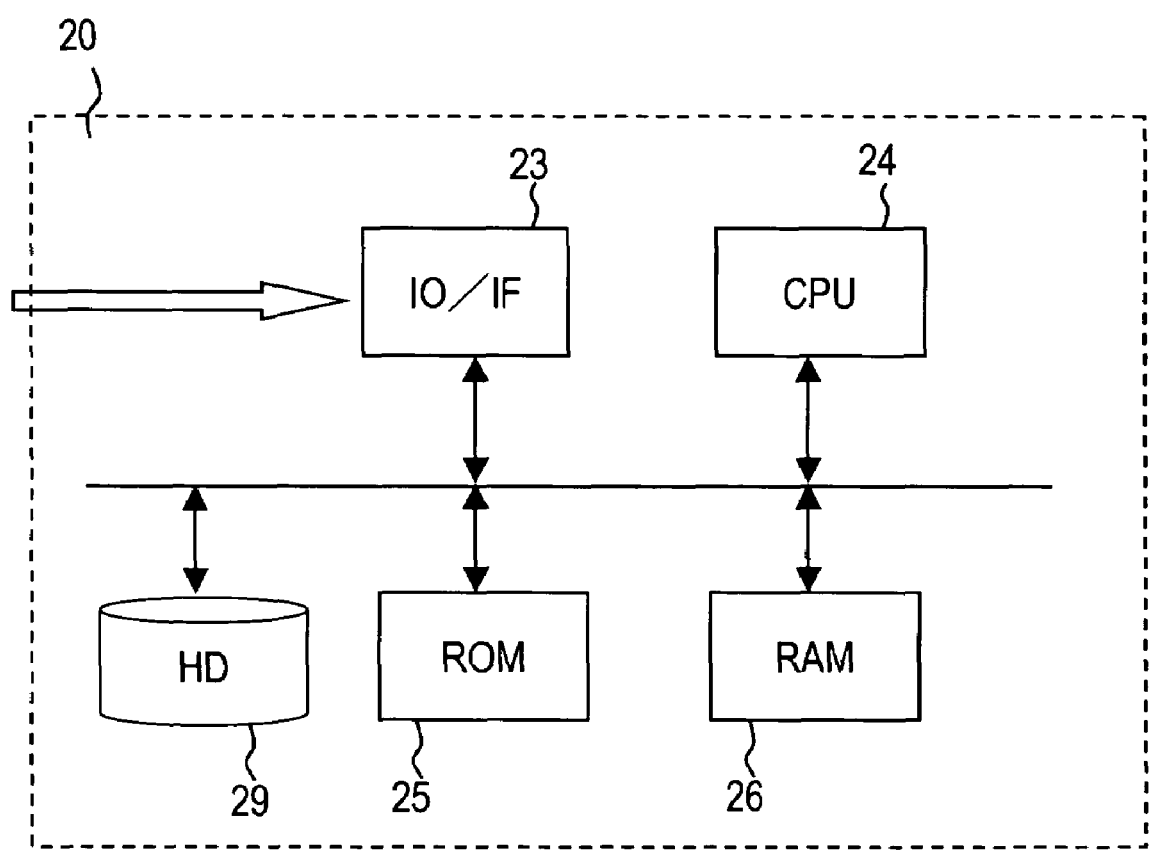
FIG. 19 is a block diagram depicting the specific hardware of an image processor including the half tone processing section for performing image processing of the present embodiment.

FIG. 19 is a block diagram depicting a specific hardware of the image processor, including the half tone processing section for performing image processing according to the present embodiment. The color conversion section 21 and half tone processing section 22 constituting the image processor 20 in FIG. 18 correspond to the CPU 24, RAM 26 and ROM 25 in FIG. 19.

The image processor 20 is comprised of an input/output interface 23, CPU 24, RAM 26, ROM 25 and hard disk 29, which are interconnected via a bus. The input/output interface 23 plays a function of an interface between the image input device 10 and the image processor 20, and an interface between the image processor 20 and the image output device 30. To the input/output interface 23, RGB image data, which is transferred from the image input device 10 according to a predetermined transmission method, is input, and is converted into data that can be processed by the image processor 20. The RGB image data is stored in the RAM 26 once. Then the output grayscale data for each pixel is sent from the input/output interface 23 to the image output device 30 according to a predetermined transmission method.

The CPU 24 functions as the image processor 20 and executes predetermined processing by reading the programs stored on the hard disk 29 or ROM 25 via the bus, and executing these read programs under a predetermined operating system.

Figure 24:
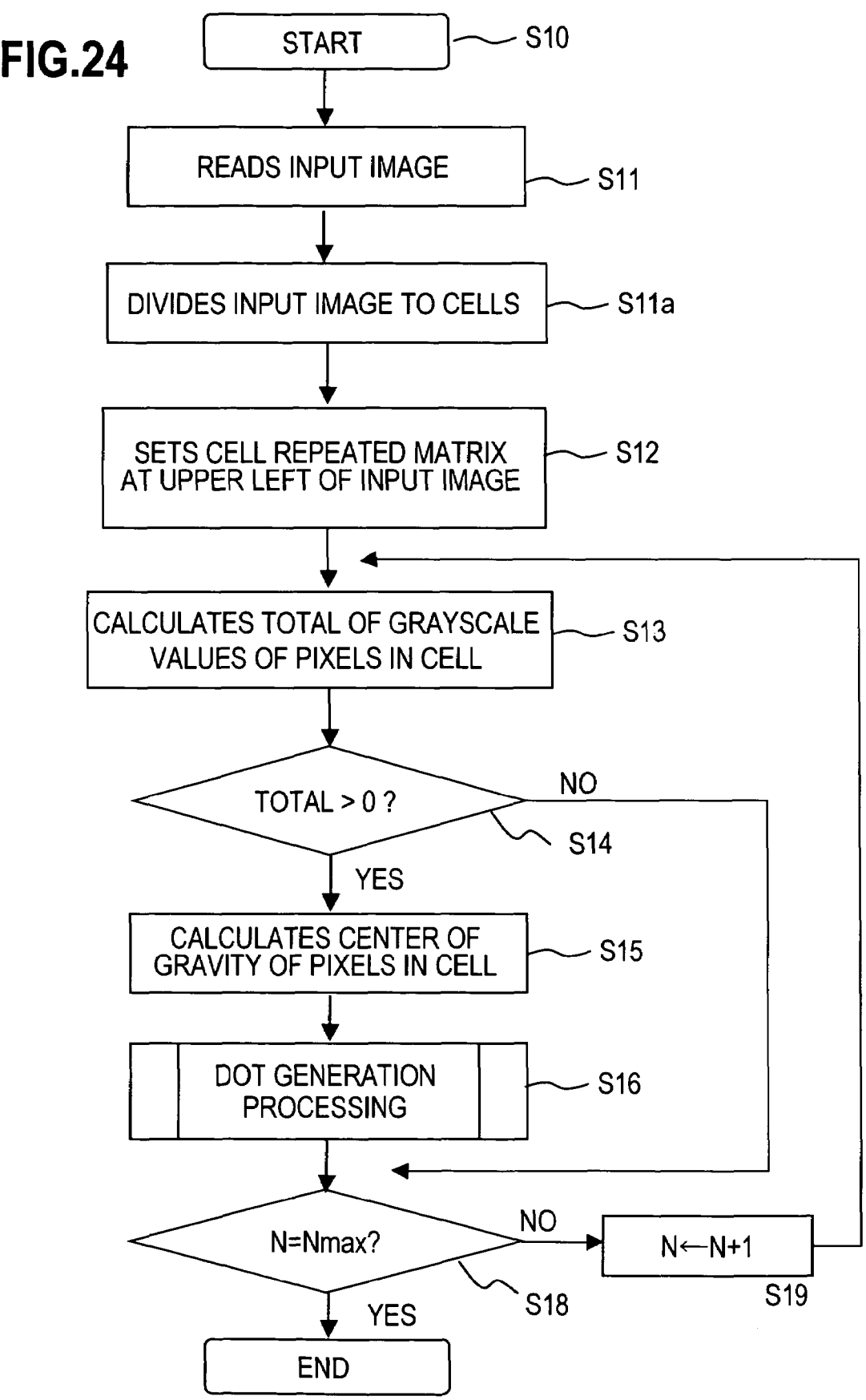
FIG. 24 is a flow chart depicting the grayscale conversion processing according to the present embodiment.

The half tone processing section 211 divides the input image data into cells which are comprised of a plurality of pixels respectively based on the half tone dot positions according to the AM screen. The pixel number of cells may be constant in the present embodiment. Then the center of gravity position of the cell is calculated from the input grayscale value and the coordinates of each pixel in the cell. And integral processing is performed by adding or subtracting a predetermined value to the coordinates of the center of gravity position calculated for predetermined cells, so as to determine the pixel at the center of gravity position. And the center of the dither matrix for grayscale conversion is corresponded to the pixel at the determined center of gravity position. Then referring to the grayscale conversion table of the corresponded dither matrix, the input grayscale value of each pixel in the cell is converted into an output grayscale value. Specifically, the processing shown in the later mentioned flow charts in FIG. 24 and FIG. 25 is executed.

The program to execute these processings may be stored on the hard disk 29 or ROM 25 in advance, or may be supplied from the outside via a computer-readable recording medium, such as a DVD-ROM or CD-ROM, and stored on the hard disk 29 via a program reading unit, which is not illustrated. Or programs may be stored on the hard disk 29 or ROM 26 by accessing the server which supplies the programs over a network, such as the Internet, and downloading the data.

As described above, according to the present embodiment, the input image data, which is the CMYK image data DT to be output by the color conversion section 213, is multi-grayscale data, 8 bits each color, and each color has 256 types of grayscale values from "0" to "255". The half tone processing section 211 performs quantization processing to convert the input image data into quantized data for controlling the size of the dots to be formed for each color component. The image output device 30 generates drive pulses according to the predetermined converted grayscale data, that is output grayscale data for each pixel, as mentioned above, and controls the output of the dots of each color components for printing.

[Outline of Grayscale Conversion Processing]

Now an outline of grayscale conversion processing by the half tone processing section 211 will be described with reference to FIG. 20-FIG. 22. This description is for making it easier to understand the description on the later mentioned processing flow charts in FIG. 23 and FIG. 24 on the image processing of the present embodiment.

Figure 20:
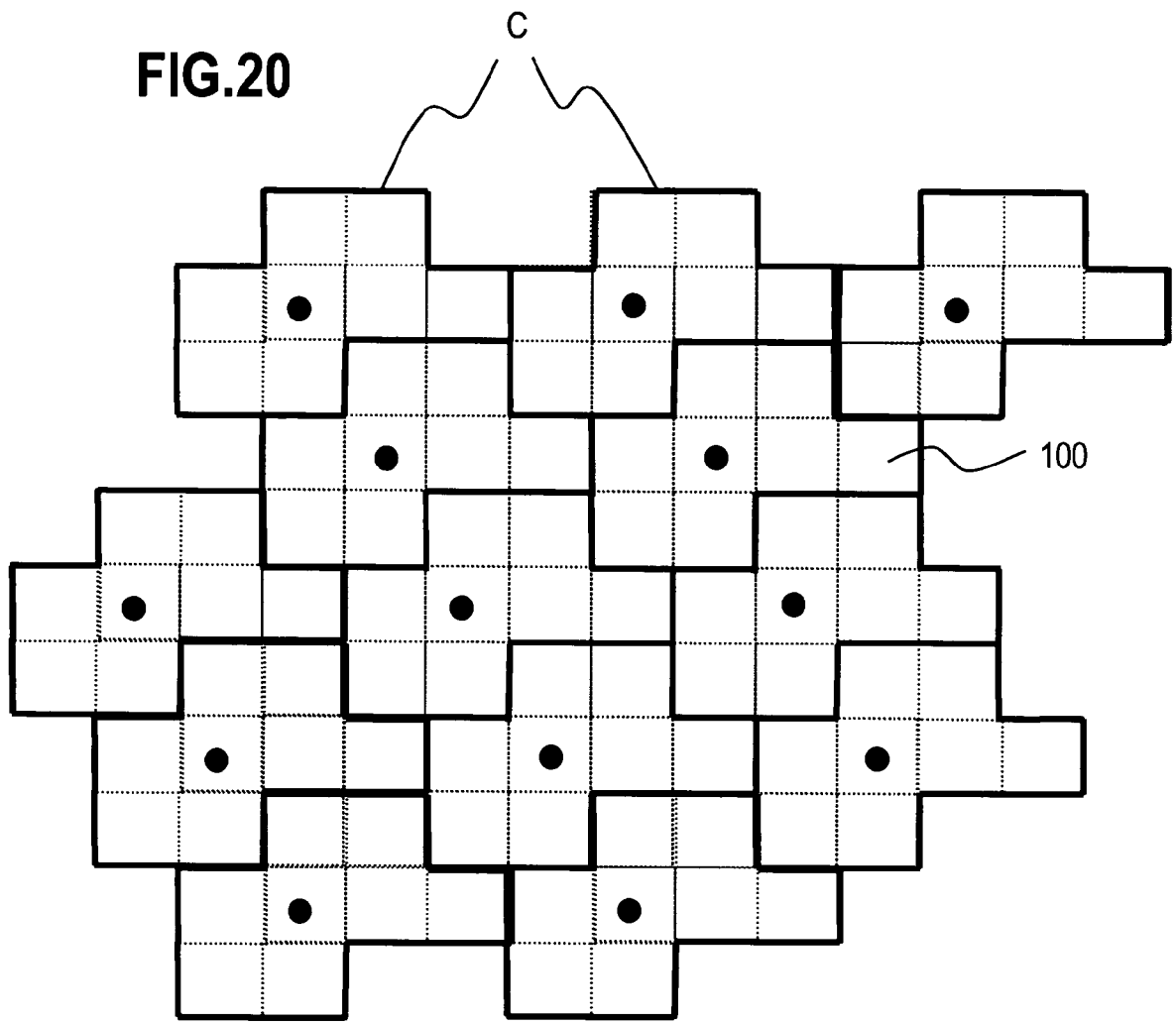
FIG. 20 is a diagram depicting the relationship between input image data and a recursive matrix.

FIG. 20 shows a screen structure according to the present embodiment. For the matrix type input image data 100, pixels at positions of half tone dot (black dots in FIG. 20) constituting the screen are regularly set, and the input image data 100 is divided into the cells C indicated by the bold line with this half tone dot position at the center. In FIG. 20, cell C, comprised of 8 pixels, is allocated to pixels in matrix. And if the grayscale values in the cell are uniform, the pixel near the center of each cell C (pixel indicated by a black dot) corresponds to the center pixel of the half tone dot formed in the cell. In FIG. 20, 13 cells C correspond to the 8×8 pixels input image data 100.

FIG. 21 are diagrams depicting an example of the dither matrix 200 to be applied to the cell C in FIG. 20 in the present embodiment. This dither matrix is comprised of the index matrix in FIG. 21A and the gamma table in FIG. 21B. The index matrix has table numbers which indicate a gamma table to which each pixel in the cell should refer, and the gamma table has four types of tables, 1, 2, 3 and 4, where the input grayscale values and output grayscale values are corresponded. Table 1 has the highest output grayscale value in an area where the input grayscale value is low, so Table 1 is corresponded to the center pixel of the half tone dot. In other words, Table 1 is corresponded to the half tone dot position, which is a black dot in FIG. 20. Tables 2, 3 and 4 sequentially reach the maximum output grayscale value as the input grayscale value becomes higher, so these are corresponded to the pixels around the pixel at the half tone dot position. Therefore if the input grayscale value is 40, the output grayscale value is 255 in the Gamma Table 1, the output grayscale value is 16 in the Gamma Table 2, and the output grayscale value is 0 in the Gamma Tables 3 and 4.

By referring to the corresponding gamma table of the dither matrix 200, the input grayscale value of each pixel in the cell is converted into an output grayscale value. Therefore the dither matrix 200 is also called the "grayscale conversion matrix", and the gamma table is also called the "grayscale conversion table".

In the present embodiment, the gamma table has a plurality of bits (8 bits) of output grayscale values corresponding to the 8 bits of the input grayscale values, but the output grayscale value may be 1 bit. In this case, the output image value has information on whether a dot is formed in a pixel or not.

If the output grayscale value is comprised of a plurality of bits, the output image value is multi-grayscale data to indicate the dot formed area in the pixel.

If the output grayscale value by the dither matrix has 1 bit information on whether a dot is formed in a pixel or not, the threshold data may be stored in each pixel. In this case, the input grayscale value and the threshold data are compared, and whether a dot is formed or not is determined depending on which is greater. If the output grayscale value has 1 bit, the output grayscale data in the gamma table may be comprised of "1s" and "0s". And if the output grayscale value has a plurality of bits, such as 8 bits, then the output grayscale value of the gamma table also becomes a plurality of bits of data.

Now the grayscale conversion processing to be performed for each pixel of the cell will be described with reference to FIG. 22. In the present embodiment, the dither matrix 200 is not uniformly allocated to the matrix type pixels, unlike the case of FIG. 20, but the center position of the dither matrix (pixel of Gamma Table 1) is corresponded with the center of gravity pixel of each cell C. Therefore the processing to determine the center of gravity position of the cell and shifting the dither matrix is required.

Figure 22A:
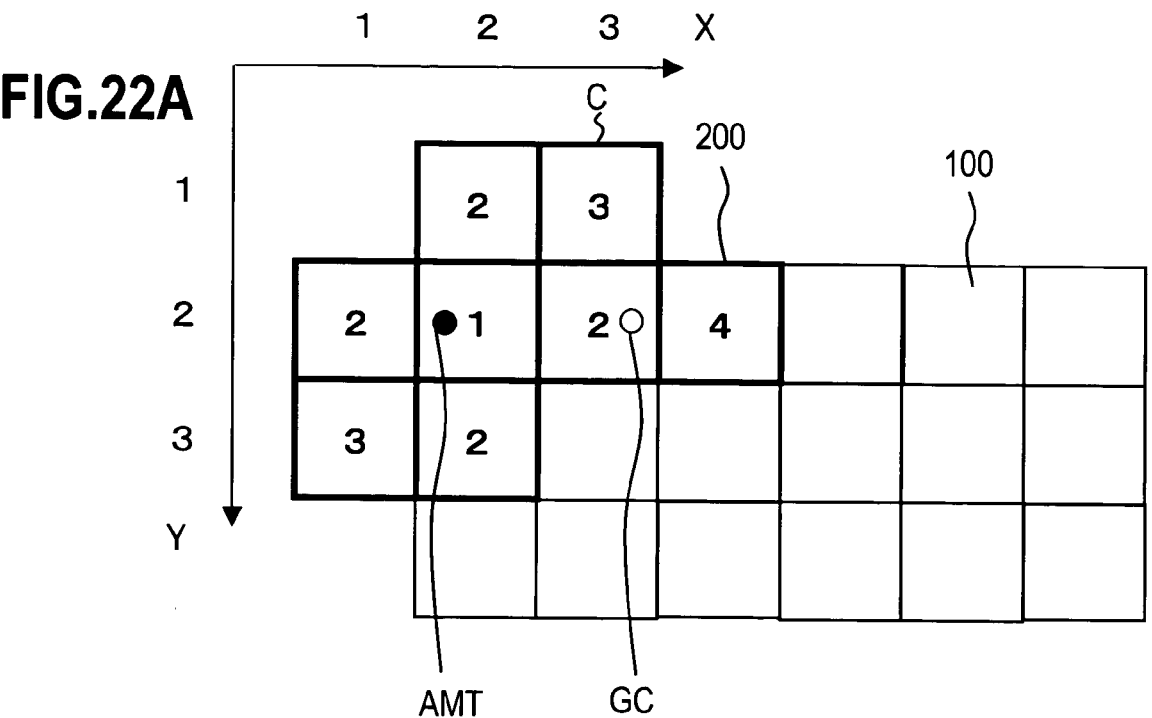
FIG. 22 are diagrams depicting grayscale conversion processing according to the present embodiment.

In FIG. 22A, the coordinates of the X axis, which is a horizontal direction of the cell C, and the Y axis, which is a vertical direction thereof, are defined. While the calculated center of gravity position GC (white circle in FIG. 22) of the cell C is coordinates (3, 2), and the half tone dot position AMT, which is the center position of the dither matrix 200 corresponding to the cell C, is coordinates (2, 2). In other words, the half tone dot center position AMT of the dither matrix 200 and the center of gravity position GC of the cell C are shifted one pixel in the X axis direction. The numbers in the grayscale conversion matrix 200 indicate the stored gamma table numbers for grayscale conversion.

Figure 22B:
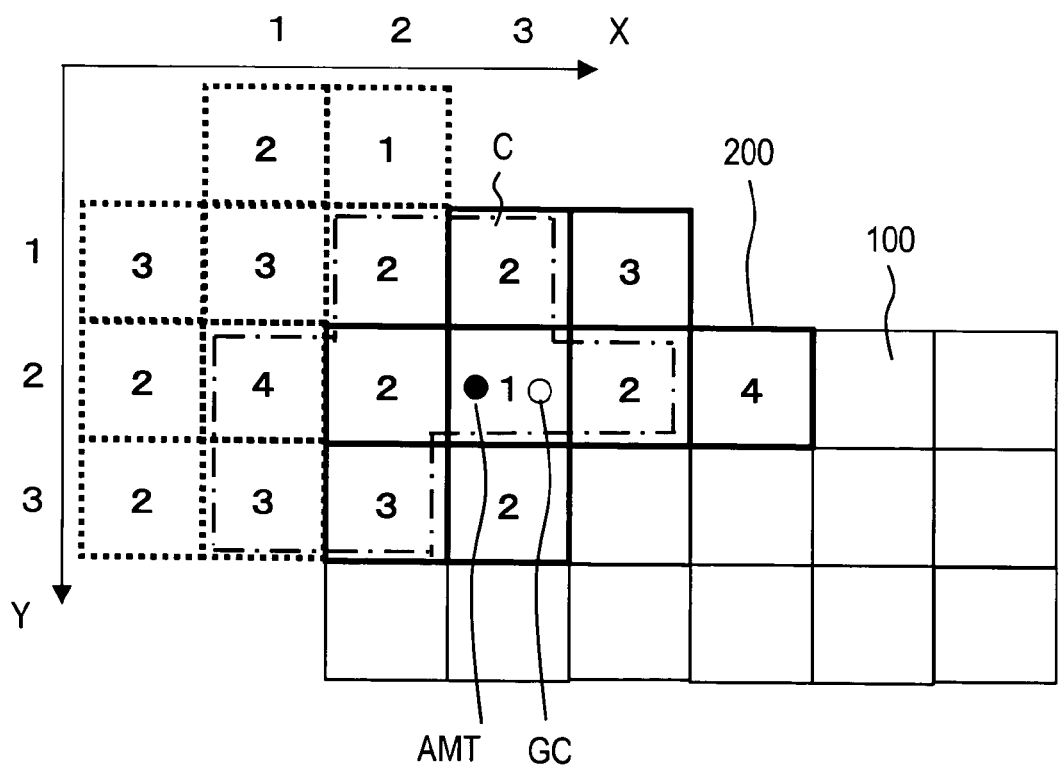

In the above case, according to the present embodiment, the center position AMT of the dither matrix 200 is shifted to the center of gravity position GC of the cell C so as to correspond to each other, as shown in FIG. 22B. In other words, in this example, the matrix 200 is shifted one pixel to the right. As a result, the half tone dot position AMT of the dither matrix 200 and the center of gravity position of the cell C match. By performing this shift processing, a half tone dot can be formed more accurately for the high grayscale pixels of an input image, and the disconnection of fine lines in the output image can be prevented.

It is assumed that the same dither matrix continuously exists surrounding the shifted dither matrix 200, as shown by the broken line in FIG. 22B, and the pixels in the cell and the gamma table numbers of the dither matrix are corresponded to each other. And when the grayscale of each pixel in the cell is converted, the input grayscale value of each pixel is converted into an output grayscale value based on the gamma table of the dither matrix 200 indicated by the bold line or the adjacent dither matrix indicated by the broken line.

In the example in FIG. 22, the table number to which the center of gravity pixel GC (coordinates (3, 2)) refers is "2" in FIG. 22A, but the table number becomes "1" as the result of the shift processing in FIG. 22B. By shifting the dither matrix 200 in this way, a dot can be likely formed at the center of gravity position of the cell C, and the probability that the center of gravity position becomes the half tone dot position increases, an output image as faithful as possible to the input image can be acquired.

In the grayscale conversion processing of the present embodiment, in addition to corresponding the dither matrix by shift processing, output limit processing is performed so that the total of the output grayscale values in the cell does not exceed the ideal dot size acquired from the input grayscale values. By this processing, dots in the cell formed by the output grayscale values growing unnecessarily large can be prevented, and the density of an input image and output image can be substantially matched.

Figure 23:
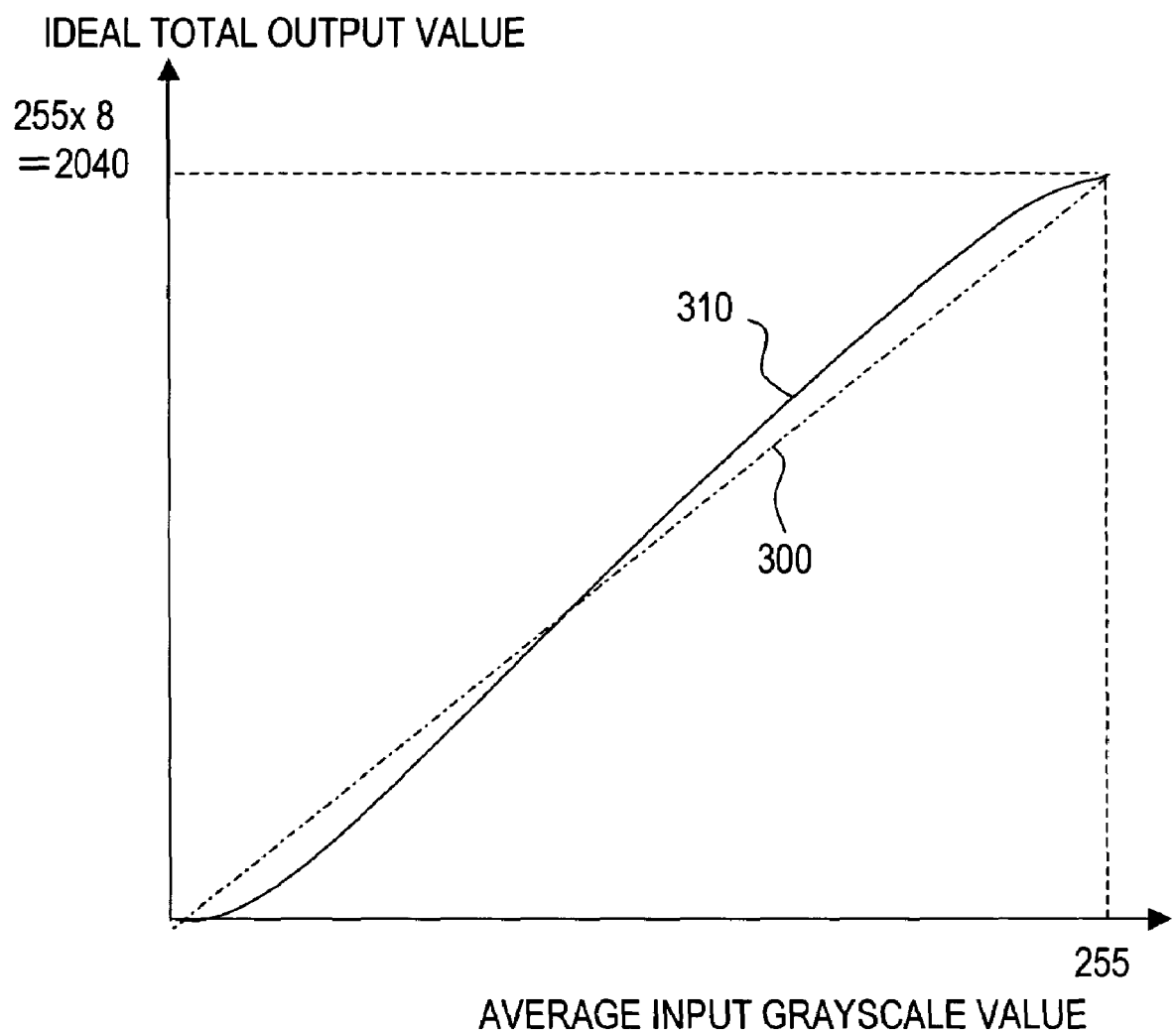
FIG. 23 is a diagram depicting the ideal total output value according to the present embodiment.

FIG. 23 is a diagram depicting the ideal total output value of the present embodiment. FIG. 23 shows an example of a graph corresponding the average input grayscale value of the cell and the ideal total output value. In this graph, the ideal total output value 0-2040 (=255×8) is set in the ordinate corresponding to the average input grayscale values 0-255 (8 bits, 256 grayscales) in the abscissa. The maximum value of the ideal total output value is 2040 (=255×8), which is a value when the maximum grayscale value of the pixel, which is 255, is multiplied by the number of pixels in the cell, which is 8.

In the graph showing the dashed line 300, the ideal total output value is in a linear relationship with respect to the average input grayscale value. In the graph showing the solid line 310, the ideal total output value is in a non-linear relationship with respect to the average input grayscale value, and this non-linear relationship is set to correct the device characteristics (characteristics of output density with respect to grayscale data) of the print engine. In the case of the example in FIG. 23, the ideal total output value is set to be lower in an area where the average input grayscale value is low, and the ideal total output value is set to be higher in an area where the average grayscale value is high. Other conversion graphs have different characteristics depending on the device characteristics can be used.

As described above, by correcting the device characteristics as shown by the solid line 310, instead of setting the ideal total output value to be linear with respect to the average input grayscale value, the density limit of the output grayscale value as well as the density limit corresponding to the device characteristics, can be implemented.

[Details of Grayscale Conversion Processing]

Now grayscale conversion processing by the half tone processing section will be described with reference to the flow charts. FIG. 24 is a flow chart depicting the grayscale conversion processing according to the present embodiment. FIG. 25 is a flow chart depicting the dot generation processing in the grayscale conversion processing. The flow chart in FIG. 24 is equivalent to FIG. 8 and FIG. 9. The flow chart in FIG. 25 is equivalent to FIG. 10 and FIG. 11, but supplementary processings S164, S165, S166, S168 and S169 are not included. The same processings are denoted with the same reference numbers. Each processing shown in the flow charts is executed by the CPU 24 in FIG. 19, reading the programs and operation expression for executing these processings from the ROM 25, for example, or by storing or reading the necessary data to/from the RAM 26, for example.

As FIG. 24 shows, the CPU 24 reads the programs to execute these processings from the ROM 25, and starts processing (S10). And reads the input image data to be the target of half tone processing or grayscale conversion processing (S11). The input image data is input grayscale data for each pixel in matrix, and here image data with the color component cyan is read as the input image data as an example. The grayscale conversion processing, however, is performed not only for the color component cyan of the input image data, but for all color components of the image data. In the case of a monochrome image, grayscale conversion processing is performed for single color input grayscale data.

Then the input image data which was read is divided into cells which are comprised of a plurality of pixel groups respectively (S11a). The input image data is divided into cells according to the half tone dot positions arrayed with a predetermined space, such that the center of the cell matches the half tone dot position. As described above, if input grayscale data with a plurality of color components such as CMYK is processed, the screens to be used for each color component may be mutually rotated or shifted or different screens may be used to prevent the generation of moiré caused by the mutual interference of color components. Therefore a half tone dot position may be different from each other depending on the color component, and input image data with each color component may be divided into cells with different shapes.

Then the cell processing number N is set to each cell from the upper left cell of the plurality of divided cell groups in a raster sequence, and the grayscale conversion matrix 200 is corresponded to the upper left cell with N=1 in the input image data 100 (S12). The subsequent processings S13-S16 are repeated for all cells (S18, S19).

First the total of the input grayscale values of the pixels of the processing target cell is calculated (S13), and it is judged whether the total of the input grayscale values is greater than "0" (S14). If the total is not greater than "0" (S14: NO), it means that the input grayscale values of all the pixels in the cell are "0", so the processing advances to step S18, without executing the grayscale conversion processings for dot formation in S15 and S16. In this case, the input grayscale value directly becomes the output grayscale value (all "0"). By this, the load on grayscale conversion processing can be decreased.

If the total of input grayscale values is greater than "0" (S14: YES), then the center of gravity position of the pixels in the cell is calculated (S15). If the coordinates of the center of gravity position of the cell is (XG, YG), each coordinate is calculated by the following formula. This formula is the same as the above mentioned formula.

$XG=[\Sigma\{(X \text{ coordinate of each pixel}) \times (\text{grayscale value of each pixel})\}]/\text{total grayscale values of cell}$ $YG=[\Sigma\{(Y \text{ coordinate of each pixel}) \times (\text{grayscale value of each pixel})\}]/\text{total grayscale values of cell}$ Then the dot generation processing, including the grayscale conversion processing of the pixels in the cell, is performed (S16). In this processing, a dither matrix is corresponded to the cell, and referring to the grayscale conversion table corresponding to each pixel of the cell, the input grayscale value of each pixel is converted into an output grayscale value for forming dots.

The above processings S13, S14, S15 and S16 are repeated until the cell number N becomes the maximum value Nmax. In the case of the example in FIG. 20, Nmax=13, if the cell number N is not the maximum value Nmax (S18: NO), the cell number N is incremented to N+1 (S19), and the processing returns to step S13, then the processings from step S13 to S16 are repeated for the next grayscale conversion target cell. If the cell number N reaches the maximum value Nmax, on the other hand (S18: YES), it means that grayscale conversion to output grayscale values ended for all the pixels to be the target of grayscale conversion, so half tone processing ends.

In the dot generation processing S16 in FIG. 25, the ideal total output grayscale value to be output in the cell is determined (S16A), the processing sequence is decided for the pixels in the cell, that is in the sequence closer to the center of gravity pixel (S16B), and the center of the dither matrix is shifted to the center of gravity position (S16C). And for all the pixels in the cell (cell number m=8) (S16D, S16I) output grayscale values are acquired by referring to the corresponding gamma table (S16E), and the output values are output to the output buffer in the RAM (S16G). The output grayscale values are output in a range where the total of the output grayscale values in the cell do not exceed the ideal total output grayscale value (NO in S16F), and if the total of the output grayscale values exceed the ideal total output grayscale value (YES in S16F), the output grayscale values are adjusted to be equal to the ideal total output grayscale value before output (S16J). If the total output value exceeds the ideal value (YES in S16F) or if the grayscale conversion is completed for all the pixels in the cell (YES in S16H), dot generation processing ends.

In the present embodiment, the supplementary processings (S169, S166) performed when the total output value does not reach the ideal value, shown in step S164 and later in FIG. 10, are not performed.

Now half tone processing will be described using an example.

FIG. 26 are diagrams depicting the half tone processing for the first input grayscale data example. As FIG. 26A shows, this input grayscale data is for a uniform image of which grayscale values are "40" for all the pixels. Therefore as FIG. 26B shows, the total of the input grayscale values of the cell C "320" is determined in step S13, and the center of gravity coordinates (2.3, 2) is determined in step S15. And in step S16A, the ideal total output value "320" is determined referring to the ideal total output value table in FIG. 23. In FIG. 26C, the center of gravity 110 of the cell C is shown in a black dot.

Figure 26A:
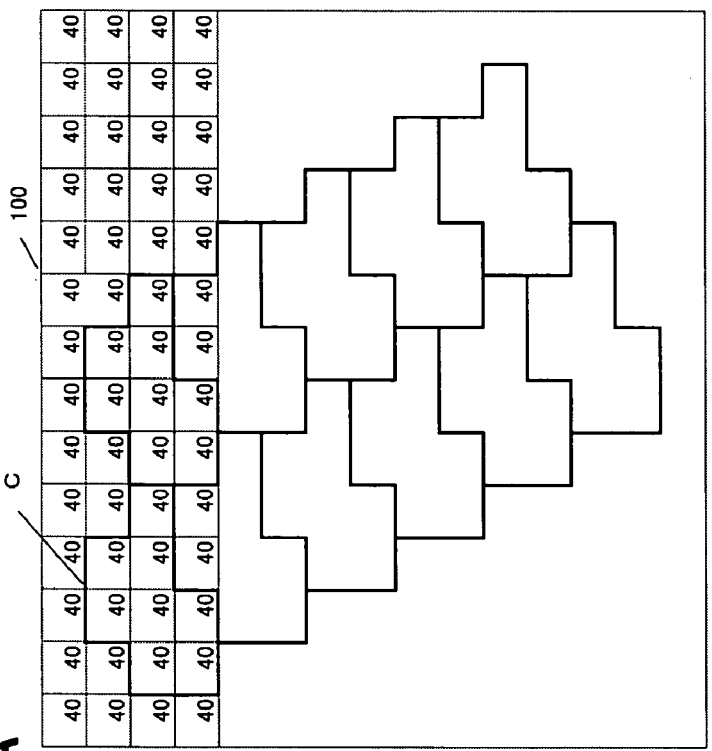
FIG. 26 are diagrams depicting the half tone processing in the first input grayscale data example.
Figure 26B:
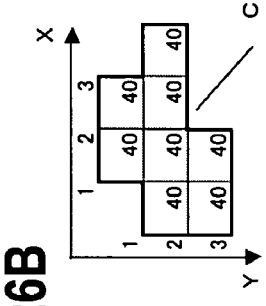
Figure 26C:
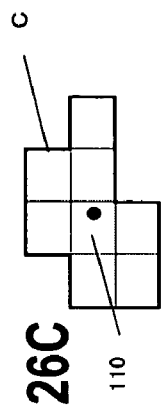
Figure 26D:
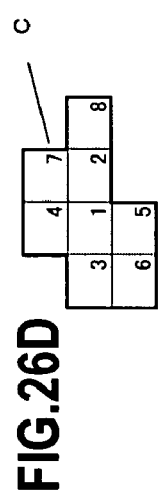

As FIG. 26D shows, the sequence of grayscale conversion processing is determined in the sequence closer to the center of gravity pixel in step S16B. According to this, the center pixel is first, the pixels at the top, bottom right and left thereof are $2^{nd}$-$5^{th}$, pixels at diagonal locations thereof are $6^{th}$ and $7^{th}$, and the last one pixel is $8^{th}$.

Figure 26E:
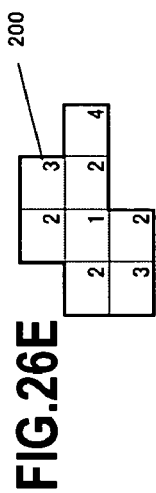
Figure 26F:
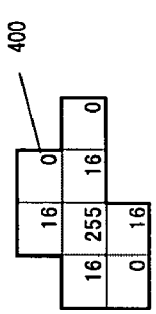

Then shift processing S16C is performed so as to match the center of gravity position of the cell and the center position of the dither matrix. In this example, the center of gravity position and the center position are already matched, so shifting is unnecessary. As a result, as FIG. 26E shows, the index table of the dither matrix 200 is allocated. In other words, the center pixel is table "1", pixels at the top, bottom, right and left thereof are table "2", diagonal pixels are table "3", and the remaining pixel is table "4".

And the input grayscale value of each pixel is converted into an output grayscale value according to the above processing sequence. In the pixel of which the processing sequence is "1", the input grayscale value "40" is converted into the output grayscale value "255" referring to the Gamma Table 1 in FIG. 21 (S16E), and is output to the output buffer (S16G). FIG. 26 F shows the output buffer 400 where output grayscale values are output. Then in the pixels with the processing sequence "2"-"5", the input grayscale value "40" is converted into the output grayscale value "16" respectively, referring to the Gamma Table 2 in FIG. 21 (S16E). And the total of these output grayscale values is "319 (=255+16×4)", which does not exceed the ideal total output value "320" (NO in S16F), so all of these output values are output to the output buffer (S16G). In the remaining pixels with the processing sequence "6", "7" and "8", all the input grayscale values are converted into the output grayscale value "0", referring to Gamma Table 3 or 4, and are output to the output buffer. When conversion processing for all the pixels completes, the grayscale conversion processing in the half tone processing in FIG. 24 and FIG. 25 ends.

FIG. 27 are diagrams depicting the half tone processing for the second input grayscale data example. As FIG. 27A shows, this input grayscale data is for an image where two pixels at the left end of the cell C are "60" and "40", and the remaining pixels are all the grayscale value "0". Therefore as FIG. 27B shows, the total of the input grayscale values of the cell C "100" is determined in the step S13, and the center of gravity coordinates (1, 2.4) is determined in step S15. And in step S16A, the ideal total output value "100" is determined. In FIG. 27C, the center of gravity 110 of the cell C is shown in a black dot in the pixel at the left end.

Figure 27A:
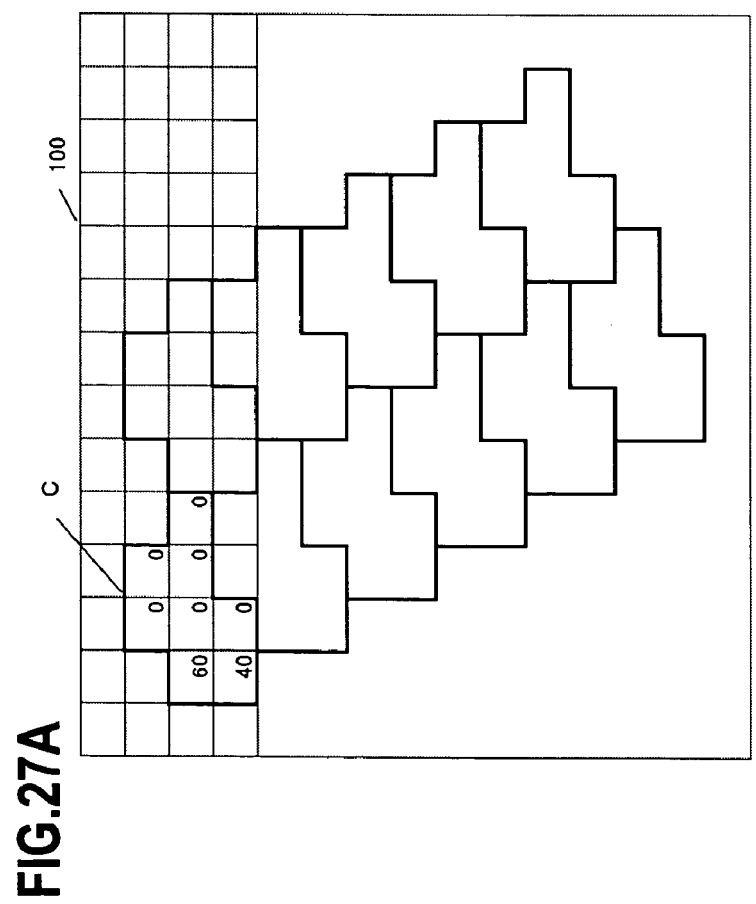
FIG. 27 are diagrams depicting the half tone processing in the second input grayscale data example.
Figure 27B:
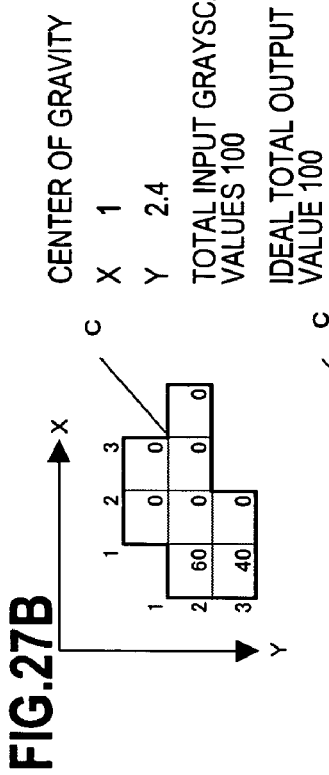
Figure 27C:
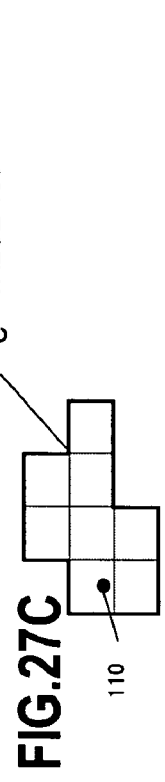
Figure 27D:
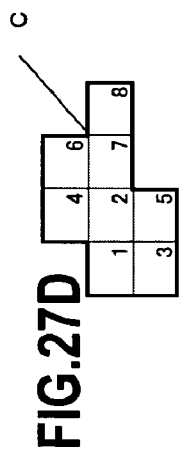

As FIG. 27D shows, the sequence of the grayscale conversion processing is determined in the sequence closer to the center of gravity pixel in step S16B. According to this, the pixel at the left end is the $1^{st}$, the pixels at the right and bottom thereof are $2^{nd}$ and $3^{rd}$, pixels at the diagonal locations thereof are $4^{th}$ and $5^{th}$, and the remaining three pixels are $6^{th}$, $7^{th}$ and $8^{th}$.

Figure 27E:
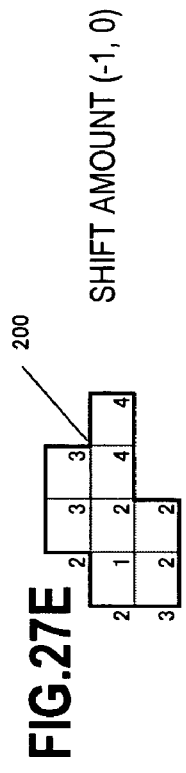
Figure 27F:
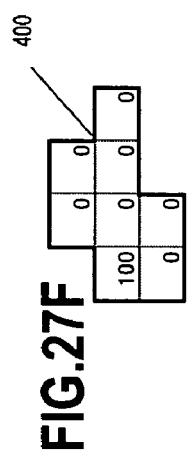

Then the shift processing S16C is performed so as to match the center of gravity position of the cell C and the center position of the dither matrix 200. In this example, the center of gravity position is shifted −1 from the center position in the X axis direction, so the shift amount is (−1, 0). As a result, as FIG. 27E shows, the index table of the dither matrix 200 is allocated. In other words, the pixel at the left end is table "1", pixels at the top, bottom, right and left thereof are table "2", the diagonal pixel is table "3", and the remaining pixels are tables "3" and "4".

And the input grayscale value of each pixel is converted into the output grayscale value according to the above processing sequence. In the pixel of which the processing sequence is "1", the input grayscale value "60" is converted into the output grayscale value "255" referring to the Gamma Table 1 (S16E), and since the output grayscale value "255" exceeds the ideal total output value "100" (YES in S16F), the output grayscale value is adjusted to "100" so as to match the ideal total output value "100" (S16J). The total of the output grayscale value has already exceeded the ideal total output value, so grayscale conversion of the remaining pixels is not performed. As a result, the grayscale conversion processing in the half tone processing in FIG. 24 and FIG. 25 ends in the status of the output grayscale values of the output buffer 400 in FIG. 17F. Since dots are formed in the high grayscale pixels of the input grayscale data, the image quality of the output image improves. Also the total of the input grayscale values and the total of the output grayscale values match, so the density of the cell of the output image is regenerated to be the same density as the input image.

FIG. 28 are diagrams depicting the half tone processing for the third input grayscale data example. As FIG. 28A shows, this input grayscale data is for an image where the densities are not uniform in the pixels at both the right and left end in the cell C, that is grayscale value "200" and "255". Therefore as FIG. 28B shows, the total of the input grayscale values in the cell C, "455", is determined in step S13, and the center of gravity coordinates (2.7, 2) are determined in step S15. And in step S16A, the ideal total output value "455" is determined. In FIG. 28C, the center of gravity 110 of the cell C is shown in a black dot. And as FIG. 28D shows, the sequence of grayscale conversion processing is determined in the sequence closer to the center of gravity pixel in step S16B.

Figure 28A:
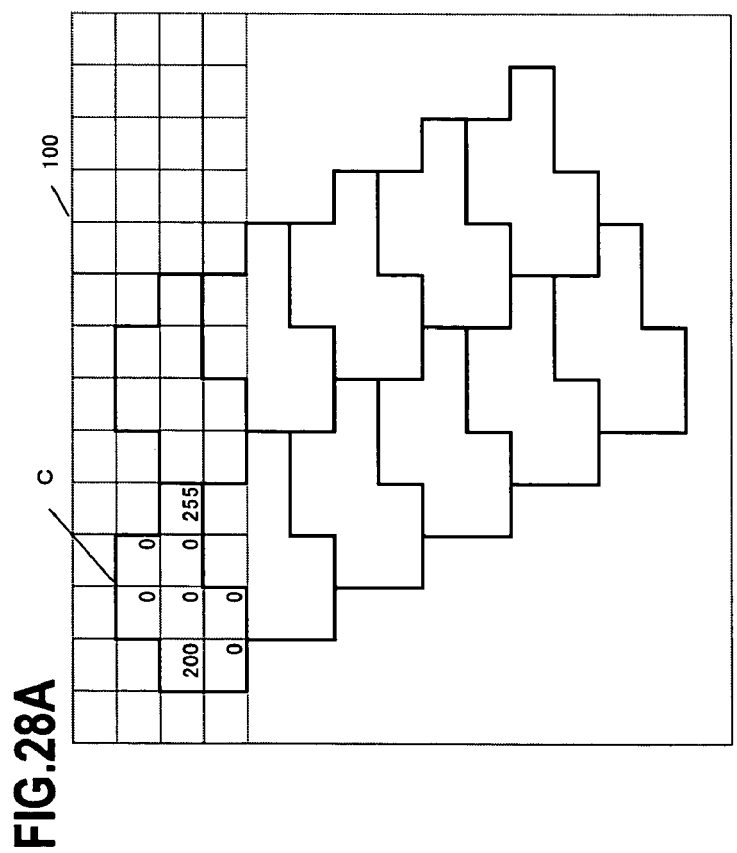
FIG. 28 are diagrams depicting the half tone processing in the third input grayscale data example.
Figure 28B:
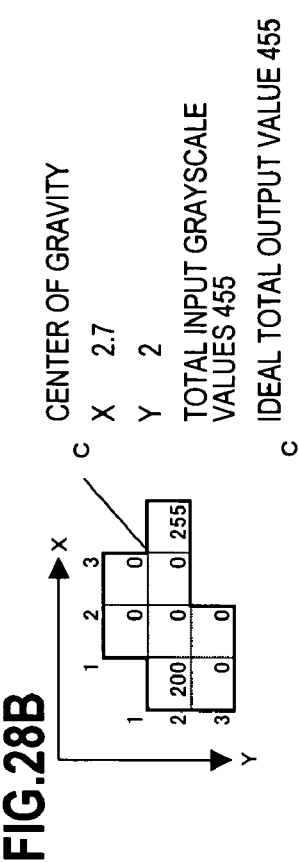
Figure 28C:
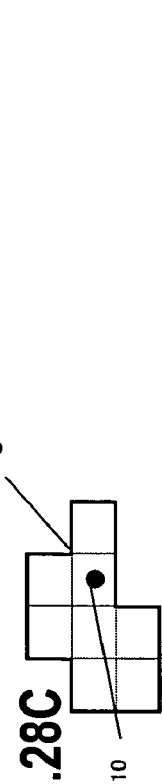
Figure 28D:
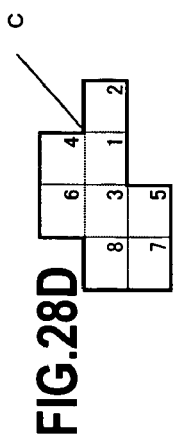
Figure 28E:
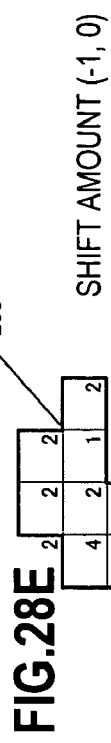

Then the shift processing S16C is performed so as to match the center of gravity position of the cell and the center position of the dither matrix. In this example, the center of gravity position 110 is shifted +1 from the center position in the X axis direction, so the shift amount is (1, 0). As a result, as FIG. 28E shows, the index table of the dither matrix 200 is allocated.

Figure 28F:
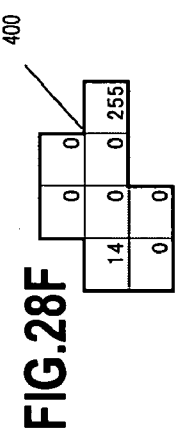

And the input grayscale values of each pixel is converted into the output grayscale value according to the above processing sequence. In the pixel of which processing sequence is "1", the input grayscale value "0" is converted into the output grayscale value "0" referring to Gamma Table 1 (S16E), and is output to the output buffer (S16G). Then in the pixel of which processing sequence is "2", the input grayscale value "255" is converted into the output grayscale value "255" (S16E) referring to Gamma Table 2, and is output to the output buffer (S16G). Also in the pixels of which processing sequence is "3"-"7", the output grayscale value "0" is output referring to Gamma Table 2 or 3. Finally in the pixel of which processing sequence is "8", the input grayscale value "200" is converted into the output grayscale value "14" referring to Gamma Table 4, and since the total output value "269" does not exceed the ideal total output value "455" (NO in S16F), the output grayscale value is output to the output buffer (S16G). By this, the processing of all the pixels ends, and the half tone processing in FIG. 25 and FIG. 26 ends. FIG. 28F shows the output grayscale values of the output buffer 400 after grayscale conversion is performed.

In the case of the third input grayscale data, the total of the output grayscale values is "269", which is much smaller than the ideal output value "455". If pixels with high grayscale values exist distant from each other in the cell, this result occurs, and the density of the output image and the density of the input image greatly differ.

In this case, supplementary processings S169 and S166, described in FIG. 10, are executed, then the change of density can be minimized. This processing performed by the CAPIX method in FIG. 12, for example, will be described below.

The processing of the CAPIX method is a processing of determining the total of the input grayscale values in the cell to which the dither matrix 200 is applied, and relocating a high output grayscale value to a pixel with a high input grayscale value with priority. In other words, an output grayscale value is allocated for each pixel without determining the center position of the half tone in the cell, so the output grayscale data with a high grayscale value is allocated for the pixel with a high grayscale value of the input grayscale data, so the output values can be acquired with maintaining resolution.

When FIG. 12 is described using the input grayscale data in FIG. 28 as an example, the CPU 24 sorts the pixels in the cell in the sequence of greater input grayscale value (S1691), and two pixels with the input grayscale values "255" and "200" are sorted first, then the six pixels with the input grayscale value "0" are sorted next. Then the CPU 24 substitutes the residual grayscale value with the ideal grayscale value "455"

(S1692). And the CPU 24 adds the residual grayscale value to the first unprocessed pixel of the sorted pixel list, and judges whether this value exceeds the maximum output value of the pixels (S1693). The maximum output value of the pixels is "255". If the maximum value is exceeded (YES in S1693), the value to add is adjusted so as to be equal to the maximum output value (S1695), and this value is added to the first unprocessed pixel (S1696). If the maximum output value is not exceeded (NO in S1693), the residual grayscale value is used as the value to be added to the pixel (S1694), and this value is added to the first unprocessed pixel (S1696).

In the case of the example of the input grayscale data in FIG. 28, if the residual grayscale data "455" is added to the pixel with input grayscale value "255", the result exceeds the maximum grayscale value "255" (YES in S1693), so the add value is adjusted to "255" (S1695), and the output grayscale value "255" is allocated to this pixel (S1696). And the CPU 24 subtracts the output grayscale value "255" from the residual grayscale value "455" (S1697), and processing is repeated until the residual grayscale value becomes 0 (S1698). In this example, the residual grayscale value becomes "200" (=455-255), and this value is output to the pixel with input grayscale value "200", and processing ends. As a result, the output grayscale data becomes the same as the input grayscale data, a big change in density can be prevented, and resolution is maintained.

The high screen rulings dither processing in FIG. 13 and the processing to add an insufficient grayscale value to the pixels near the center of gravity in FIG. 14 can also be executed in the same manner.

As described above, in the half tone processing according to the second embodiment, shift processing is performed so that the half tone dot center pixel of the dither matrix corresponds to the pixel at the center of the gravity of the cell, and processing to convert the input grayscale value into the output grayscale value is performed referring to the gamma table corresponding to each pixel. And the converted output grayscale value is adjusted so that the total of the output grayscale values do not exceed the ideal total output value. And even if the total of the output grayscale values do not reach the ideal total output value, supplementary processing for high-speed processing need not be performed.

The output grayscale value of the gamma table may be 1 bit or a plurality of bits. Threshold data may be stored in the gamma table, so that 1 bit of output data may be generated by comparing the input grayscale value and the threshold.

The present embodiment can also be applied to another print engine type image formation device other than a laser printer.

What is claimed is:

1. An image processor for converting an input grayscale value of each pixel of an input image into an output grayscale value having two or more grayscales, comprising:
   a pixel dividing unit that divides the input image into pixel groups each including a plurality of pixels;
   a center of gravity position decision unit that decides a center of gravity position of said pixel group from said input grayscale value of each pixel included in said pixel group;
   a positioning unit that positions a center of a dither matrix on the center of gravity position of said pixel group; and
   an output unit that acquires said output grayscale value by corresponding said positioned dither matrix and said input grayscale value of each pixel included in said pixel group,
   wherein said dither matrix has a plurality of elements such that as the element is closer to the center of the dither matrix, the output grayscale value with dot being more likely generated even if the input grayscale value of the input image is small is acquired.

2. The image processor according to claim 1, wherein when total of output grayscale value reaches to an ideal grayscale value based on the total of said input grayscale values in said pixel group, said output unit ends processing to acquire said output grayscale values in said pixel group.

3. The image processor according to claim 1, wherein said output unit acquires an output grayscale value sequentially from a pixel closest to said center of gravity position.

4. The image processor according to claim 1, wherein
   a table that indicates correspondence of said input grayscale value and said output grayscale value is stored in each element of said dither matrix, and
   said output unit acquires an output grayscale value corresponding to said input grayscale value by referring to the table of said dither matrix corresponding to each pixel position included in said pixel group.

5. The image processor according to claim 1, wherein thresholds are stored in said dither matrix, and said output unit acquires said output grayscale value by comparing said thresholds and said input grayscale value.

6. An image processor for converting an input grayscale value of each pixel of an input image into an output grayscale value having two or more grayscales, comprising:
   a pixel dividing unit that divides the input image into pixel groups each including a plurality of pixels;
   a center of gravity position decision unit that decides a center of gravity position of said pixel group from said input grayscale value of each pixel included in said pixel group;
   a positioning unit that positions a dither matrix having a plurality of elements so that the center of gravity position of said pixel group substantially matches an element position where a dot is most likely formed in said dither matrix; and
   an output unit that acquires said output grayscale value by corresponding said positioned dither matrix and said input grayscale value of each pixel included in said pixel group.

7. An image processing method for converting input grayscale value data of each pixel of an input image into output grayscale value data having two or more grayscales, comprising:
   dividing the input image into pixel groups each including a plurality of pixels;
   deciding a center of gravity position of said pixel group from said input grayscale value data of each pixel included in said pixel group;
   positioning a center of a dither matrix on the center of gravity position of said pixel group; and
   converting said input grayscale value data into said output grayscale value data by corresponding said positioned dither matrix and said input grayscale value data of each pixel included in said pixel group,
   wherein said dither matrix has a plurality of elements such that as the element is closer to the center of the dither matrix, the output grayscale value data with dot being more likely generated even if the input grayscale value of the input image is small is acquired.

8. An image processing method for converting input grayscale value data of each pixel of an input image into output grayscale value data having two or more grayscales, comprising:

dividing the input image into pixel groups each including a plurality of pixels;

deciding a center of gravity position of said pixel group from said input grayscale value data of each pixel included in said pixel group;

positioning said a dither matrix having a plurality of elements so that the center of gravity position of said pixel group substantially matches an element position where a dot is most likely formed in said dither matrix; and converting said input grayscale value data into said output grayscale value data by corresponding said positioned dither matrix and said input grayscale value data of each pixel included in said pixel group.

9. A storage medium storing an image processing program for causing a computer to execute an image processing for converting input grayscale value data of each pixel of an input image into output grayscale value data having two or more grayscales, the image processing-comprising:

a pixel dividing processing for dividing the input image into pixel groups each including a plurality of pixels;

a center of gravity position decision processing for deciding a center of gravity position of the pixel group from said input grayscale value data of each pixel included in said pixel group;

a positioning processing for positioning a center of a dither matrix on the center of gravity position of said pixel group; and an output processing for converting said input grayscale value data into said output grayscale value data by corresponding said positioned dither matrix and said input grayscale value data of each pixel included in said pixel group, wherein said dither matrix has a plurality of elements such that as the element is closer to the center of the dither matrix, the output grayscale value data with dot being more likely generated even if the input grayscale value of the input image is small is acquired.

10. A storage medium storing an image processing program for causing a computer to execute an image processing for converting input grayscale value data of each pixel; of an input image into output grayscale value data having two or more grayscales, the image processing comprising:

a pixel dividing processing for dividing the input image into pixel groups each including a plurality of pixels;

a center of gravity decision processing for deciding a center of gravity position of said pixel group from said input grayscale value data of each pixel included in said pixel group;

a positioning processing for positioning a dither matrix having a plurality of elements so that the center of gravity position of said pixel group substantially matches an element position where a dot is most likely formed in said dither matrix; and an output processing for converting said input grayscale value data into said output grayscale value data by corresponding said positioned dither matrix and said input grayscale value data of each pixel included in said pixel group.

* * * * *

UNITED STATES PATENT AND TRADEMARK OFFICE
CERTIFICATE OF CORRECTION

PATENT NO.       : 7,660,017 B2                                    Page 1 of 1
APPLICATION NO. : 11/432448
DATED            : February 9, 2010
INVENTOR(S)      : Nobuhiro Karito It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 850 days.

Signed and Sealed this

Twenty-eighth Day of December, 2010

David J. Kappos
*Director of the United States Patent and Trademark Office*